(12) United States Patent
Okubo et al.

(10) Patent No.: US 9,074,096 B2
(45) Date of Patent: Jul. 7, 2015

(54) POLYPHENYLENE SULFIDE RESIN COMPOSITION AND MOLDING COMPRISING SAME

(75) Inventors: Kazuya Okubo, Nagoya (JP); Atsushi Ishio, Nagoya (JP); Yuki Ota, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/114,360

(22) PCT Filed: Jun. 22, 2012

(86) PCT No.: PCT/JP2012/004045
§ 371 (c)(1),
(2), (4) Date: Oct. 28, 2013

(87) PCT Pub. No.: WO2013/001760
PCT Pub. Date: Jan. 3, 2013

(65) Prior Publication Data
US 2014/0100306 A1 Apr. 10, 2014

(30) Foreign Application Priority Data

Jun. 29, 2011 (JP) ................................. 2011-143859
Dec. 28, 2011 (JP) ................................. 2011-288600

(51) Int. Cl.
| | | |
|---|---|---|
| H01L 23/29 | (2006.01) |
| C08L 81/04 | (2006.01) |
| C08K 3/00 | (2006.01) |
| C08K 5/13 | (2006.01) |
| C08K 5/20 | (2006.01) |
| C08K 5/49 | (2006.01) |
| C08L 81/02 | (2006.01) |
| C08L 23/02 | (2006.01) |

(52) U.S. Cl.
CPC . *C08L 81/04* (2013.01); *C08K 3/00* (2013.01); *C08K 5/13* (2013.01); *C08K 5/20* (2013.01); *C08K 5/49* (2013.01); *C08L 81/02* (2013.01); *C08L 23/02* (2013.01)

(58) Field of Classification Search
CPC ......... C08L 81/02; C08L 65/02; C08L 91/08; C08L 2203/10; C08L 2203/18; C08L 2205/03; C08L 2205/06; C08L 2666/14; C08L 2666/40; C08L 2666/72; C08L 2666/82; C08K 3/00; C08K 3/0033; C08K 3/0041; C08K 3/32; C08K 5/005; C08K 5/13; C08K 5/20; C08K 5/49

USPC .......................................................... 523/435
See application file for complete search history.

(56) References Cited

U.S. PATENT DOCUMENTS

| | | | | |
|---|---|---|---|---|
| 5,045,585 A | * | 9/1991 | Bier et al. | 524/281 |
| 5,482,987 A | * | 1/1996 | Forschirm | 524/230 |
| 5,547,609 A | * | 8/1996 | Fujii et al. | 252/511 |
| 6,815,488 B2 | * | 11/2004 | Nakamura | 524/444 |
| 2005/0077653 A1 | * | 4/2005 | Holger et al. | 264/328.17 |
| 2013/0053490 A1 | | 2/2013 | Yamanishi et al. | |

FOREIGN PATENT DOCUMENTS

| | | | |
|---|---|---|---|
| EP | 1 433 818 A1 | 6/2004 | |
| EP | 2 565 234 A1 | 3/2013 | |
| JP | 95119429 B2 * | 12/1995 | ........... C10M 105/68 |
| JP | 09003326 A | 1/1997 | |
| JP | 11335556 A | 12/1999 | |
| JP | 2000 198923 A | 7/2000 | |
| JP | 2008013617 A * | 1/2008 | ............. C08L 81/04 |
| JP | 2009-256608 A | 11/2009 | |
| JP | 2010 006858 A | 1/2010 | |
| JP | 2010-84125 A | 4/2010 | |
| JP | 2010 195962 A | 9/2010 | |
| WO | WO 2011/136354 A1 | 11/2011 | |

OTHER PUBLICATIONS

Machine translation of JP 95119429 B2, Masago et al. published Dec. 20, 1995.*
Derwent abstract of JP 95119429 B2, Masago et al. published Dec. 20, 1995.*
Machine translation of JP 2008013617 A, Muneto et al. published Jan. 24, 2008.*
Derwent abstract of JP 2008013617 A, Muneto et al. published Jan. 24, 2008.*
International Search Report for International Application No. PCT/JP2012/004045 dated Sep. 11, 2012.

* cited by examiner

*Primary Examiner* — Jane L Stanley
(74) *Attorney, Agent, or Firm* — RatnerPrestia

(57) ABSTRACT

The invention provides a polyphenylene sulfide resin composition including: 1 to 100 parts by weight of an olefin elastomer (B); and 0.01 to 10 parts by weight of a carboxylic acid amide wax mixture (C), relative to 100 parts by weight of a polyphenylene sulfide resin (A), wherein the carboxylic acid amide wax mixture (C) is obtained by adding 0.01 to 5 parts by weight of an antioxidant to 100 parts by weight of a carboxylic acid amide wax produced by reaction of a higher aliphatic monocarboxylic acid, a polybasic acid and a diamine.

4 Claims, 1 Drawing Sheet

POLYPHENYLENE SULFIDE RESIN COMPOSITION AND MOLDING COMPRISING SAME

CROSS REFERENCE TO RELATED APPLICATIONS

This is the U.S. National Phase application of PCT International Application No. PCT/JP2012/004045, filed Jun. 22, 2012, and claims priority to Japanese Patent Application No. 2011-143859, filed Jun. 29, 2011, and Japanese Patent Application No. 2011-288600, filed Dec. 28, 2011, the disclosures of each of which applications being incorporated herein by reference in their entireties for all purposes.

FIELD OF THE INVENTION

The present invention relates to a PPS resin composition having excellent toughness, low gas emission and good mold releasability and a molded product thereof.

BACKGROUND OF THE INVENTION

The polyphenylene sulfide resin (hereinafter abbreviated as PPS resin) has the rigidity, the heat resistance, the hot water resistance, the chemical resistance and the molding processability in a good balance and is thus widely used for various applications. In recent years, the PPS resin is used for plumbing components and automobile applications, based on the above characteristics. The PPS resin, however, generally tends to have the lower toughness expressed by the tensile fracture elongation and the impact strength, compared with the other engineering plastics. The improvement in toughness is accordingly an important issue.

In order to solve this issue, methods of producing the PPS resin compositions by mixing various elastomers with the PPS resin have been proposed. For example, Patent Document 1 shows a method of mixing an ethylene-α-olefin elastomer having the excellent toughness. Addition of the ethylene-α-olefin elastomer to the PPS resin improves the toughness but, on the other hand, deteriorates the molding processability. In other words, mixing the ethylene-α-olefin elastomer with the PPS resin reveals the problem of increasing the gas emission and the mold deposit (mold stain) during molding and the problem of deforming a molded product in the course of mold release from a mold (deteriorating the mold releasability). This is because the PPS resin has the molding temperature of as high as 280° C. or higher and part of the ethylene-α-olefin elastomer is thermally decomposed in the process of producing a molded product. This results in increasing the gas emission during molding to cause clogging of a mold vent, deteriorating the appearance of a molded product by the mold deposit and increasing the tackiness of the surface of a molded product.

Various techniques have also been employed to reduce the gas emission and the mold deposit with respect to this PPS resin composition. For example, in order to achieve improvement in molding processability, one technique changes the elastomer to be mixed with the PPS resin to an α-olefin elastomer having high heat resistance. Another technique adds an adsorbent to trap the emitted gas. Yet another technique enforces degassing in the course of melt kneading the PPS resin with an elastomer. These techniques, however, do not sufficiently improve the mold releasability.

Patent Document 2, on the other hand, describes the configuration of using a carboxylic acid amide wax, which is obtained by the reaction of a higher aliphatic monocarboxylic acid, a polybasic acid and a diamine of the component (C), as a mold release agent. The cause of the mold deposit is, however, not limited to the ethylene-α-olefin elastomer, but generation of the degradation products of the mold release agent is also one of the major causes. The above technique alone can thus not sufficiently reduce the mold deposit. A possible measure of reducing the mold deposit is changing the above mold release agent to another mold release agent having little generation of the degradation products, which may provide the cause of mold deposit. Changing the mold release agent, however, often deteriorates the mold releasability, even when reducing the mold deposit. It is accordingly difficult to satisfy both the good mold releasability and the reduced mold deposit.

PATENT DOCUMENTS

Patent Document 1: JP 2000-198923A
Patent Document 2: JP H09-03326A

SUMMARY OF THE INVENTION

The invention provides a PPS resin composition having excellent toughness, little mold deposit and good mold releasability and its molded product.

The inventors have achieved the present invention as the result of intensive studies in order to solve the problems described above. In other words, the present invention is made to solve at least part of the foregoing, and embodiments of the present invention may include at least part of the following configurations.

(1) There is provided a polyphenylene sulfide resin composition, comprising: 1 to 100 parts by weight of an olefin elastomer (B); and 0.01 to 10 parts by weight of a carboxylic acid amide wax mixture (C), relative to 100 parts by weight of a polyphenylene sulfide resin (A), wherein the carboxylic acid amide wax mixture (C) is obtained by adding 0.01 to 5 parts by weight of an antioxidant to 100 parts by weight of a carboxylic acid amide wax produced by reaction of a higher aliphatic monocarboxylic acid, a polybasic acid and a diamine.

(2) There is provided the polyphenylene sulfide resin composition described in (1), wherein a difference between a number of carbon atoms n of at least one alkyl group of terminal structure of the antioxidant and a number of carbon atoms m of an alkyl group of the higher aliphatic monocarboxylic acid is not greater than 15.

In the above polyphenylene sulfide resin composition described in (1), however, the difference between the number of carbon atoms n of the at least one alkyl group of terminal structure of the antioxidant and the number of carbon atoms m of the alkyl group of the higher aliphatic monocarboxylic acid may be greater than 15.

(3) There is provided the polyphenylene sulfide resin composition described in either (1) or (2), wherein the antioxidant comprises a phosphorus antioxidant and/or a hindered phenol antioxidant.

(4) There is provided the polyphenylene sulfide resin composition described in any of (1) to (3), further comprising: 1 to 400 parts by weight of an inorganic filler (D), relative to 100 parts by weight of the polyphenylene sulfide resin (A).

In the above polyphenylene sulfide resin composition described in any of (1) to (3), however, the mixing amount of the inorganic filler (D) relative to 100 parts by weight of the polyphenylene sulfide resin (A) may be less than 1 part by weight. In the above polyphenylene sulfide resin composition described in any of (1) to (3), the mixing amount of the inorganic filler (D) relative to 100 parts by weight of the polyphenylene sulfide resin (A) may also be greater than 400 parts by weight.

(5) There is provided an injection molded product, which is produced by molding the polyphenylene sulfide resin composition described in any of (1) to (4).

(6) There is provided an injection molded product with a hollow part, which is produced by molding the polyphenylene sulfide resin composition described in any of (1) to (4).

(7) There is provided a production method of the polyphenylene sulfide resin composition described in any of (1) to (4), the production method mixing the polyphenylene sulfide resin (A) after mixing at least the carboxylic acid amide wax with the antioxidant.

The present invention provides a polyphenylene sulfide resin composition and an injection molded product thereof, such that the polyphenylene sulfide resin composition reduces an increase in gas emission and an increase in mold deposit, which are revealed by addition of an olefin elastomer to a polyphenylene sulfide resin for the purpose of improving the toughness, and has excellent mold releasability.

DETAILED DESCRIPTION OF EMBODIMENTS OF THE INVENTION

Figure 1:
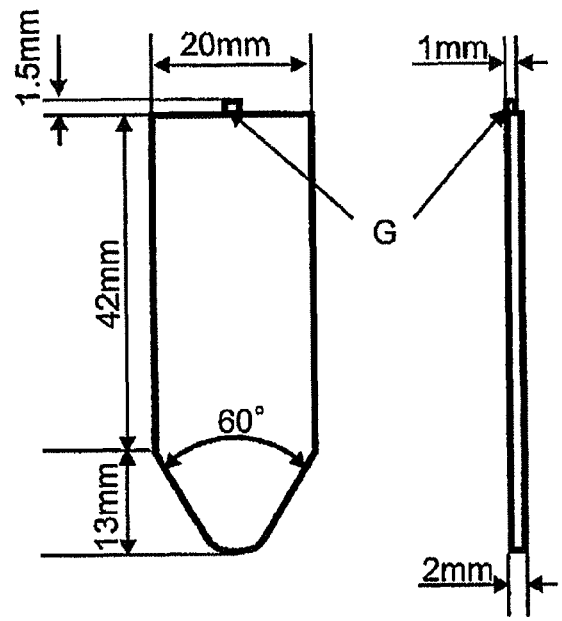
FIG. 1 is a schematic diagram illustrating a molded product for evaluation molded in Examples.

The following describes embodiments of the invention. In the description of the invention, the term "weight" means "mass".

(1) PPS Resin:

The PPS resin (A) used according to an embodiment of the invention is a polymer having a repeating unit represented by a structural formula (I) given below:

[Chem. 1]

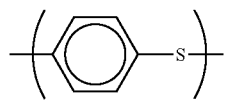

From the standpoint of heat resistance, the PPS resin (A) used according to the embodiment of the invention includes preferably not less than 70 mol % and more preferably not less than 90 mol % of the polymer having the repeating unit represented by the above structural formula. The PPS resin (A) used according to the embodiment of the invention may be a PPS copolymer having about less than 30 mol % of its repeating unit comprised of, for example, repeating units having the following structures:

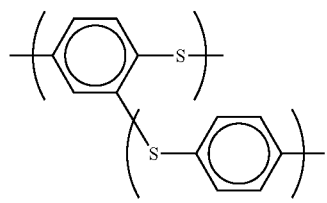

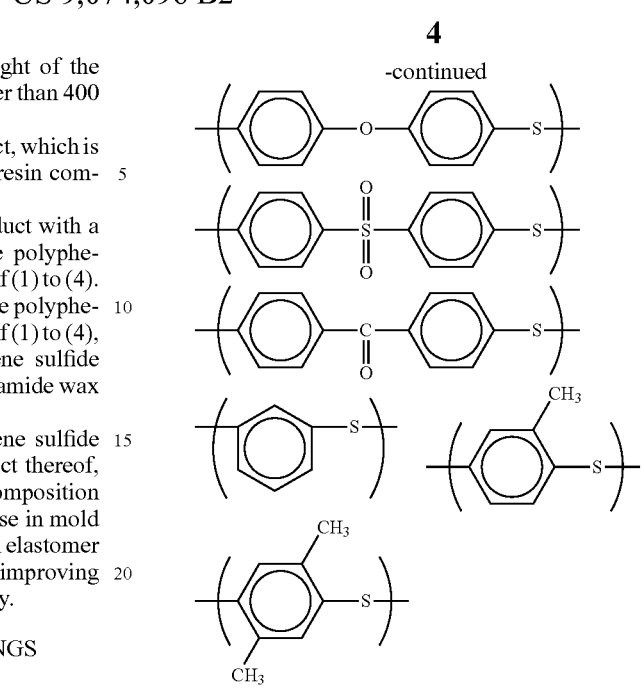

The PPS copolymer partly including the above structures has a low melting point, so that a resin composition including this PPS copolymer is likely to have an advantage in moldability.

The PPS resin (A) used according to the embodiment of the invention has a chloroform extracted volume of preferably not higher than 1.8 wt % and more preferably not higher than 1.0 wt %.

When the chloroform extracted volume is greater than 1.8 wt %, the PPS resin has a difficulty in having a better weld strength and also has a difficulty in achieving low chlorination described later. In order to produce this PPS resin (A) having the chloroform extracted volume of not higher than 1.8 wt %, a washing method with an organic solvent is preferably employed for a post treatment process described later.

The chloroform extracted volume may be determined by extracting 10 g of a PPS sample with 200 ml of chloroform for 5 hours using a Soxhlet extractor and drying the extract at 50° C. The percentage rate of the weight of the residue obtained after drying to the weight of the PPS sample before the extraction is the chloroform extracted volume.

The melt viscosity of the PPS resin (A) used according to the embodiment of the invention is not specifically restricted. From the standpoint of satisfying both the better weld strength and the good flowability, however, the melt viscosity (320° C., shear rate of 1000/s) is preferably not less than 5 Pa·s and is more preferably not less than 20 Pa·s. The melt viscosity is also preferably not greater than 2000 Pa·s and is more preferably not greater than 1300 Pa·s. Additionally, two or more polyarylene sulfides having different melt viscosities may be used in combination.

The melt viscosity according to the embodiment of the invention is a measured value using CAPILOGRAPH manufactured by Toyo Seiki Seisaku-sho, Ltd. under the conditions of 320° C. and the shear rate of 1000/s.

The following describes a production method of the PPS resin (A) used according to the embodiment of the invention, but the following method is as a matter of course not at all restrictive and may be replaced by any other method that can produce the PPS having the above structure.

First, the following describes the details of a polyhalogenated aromatic compound, a sulfidizing agent, a polymerization solvent, a molecular weight modifier, a polymerization modifier and a polymerization stabilizer used in the production method.

[Polyhalogenated Aromatic Compound]

The polyhalogenated aromatic compound used according to an embodiment of the invention means a compound having two or more halogen atoms in one molecule. Specific examples of the polyhalogenated aromatic compound include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5,-dichloro-p-xylene, 1,4-dibromobenzene, 1,4-diiodobenzene and 1-methoxy-2,5-dichlorobenzene, and p-dichlorobenzene is used preferably. Additionally, two or different polyhalogenated aromatic compounds may be used in combination to form a copolymer. This copolymer preferably has a p-dihalogenated aromatic compound as the major component.

The used amount of the polyhalogenated aromatic compound may be not less than 0.9 mol, preferably not less than 0.95 mol and more preferably not less than 1.005 mol per 1 mol of the sulfidizing agent, in order to obtain the PPS resin having the viscosity suitable for processing. The amount of the polyhalogenated aromatic compound used may also be not greater than 2.0 mol, preferably not greater than 1.5 mol and more preferably not greater than 1.2 mol.

[Sulfidizing Agent]

The sulfidizing agent used according to an embodiment of the invention may be an alkali metal sulfide, an alkali metal hydrosulfide or hydrogen sulfide.

Specific examples of the alkali metal sulfide may include lithium sulfide, sodium sulfide, potassium sulfide, rubidium sulfide, cesium sulfide and mixtures of two or more compounds selected among these alkali metal sulfides. Among them, sodium sulfide is preferably used. Any of these alkali metal sulfides may be used as a hydrate or an aqueous mixture or in the form of an anhydride.

Specific examples of the alkali metal hydrosulfide may include sodium hydrosulfide, potassium hydrosulfide, lithium hydrosulfide, rubidium hydrosulfide, cesium hydrosulfide and mixtures of two or more compounds selected among these alkali metal hydrosulfides. Among them, sodium hydrosulfide is preferably used. Any of these alkali metal hydrosulfides may be used as a hydrate or an aqueous mixture or in the form of an anhydride.

The alkali metal sulfide used as the sulfidizing agent may be an alkali metal sulfide produced in situ in the reaction system from an alkali metal hydrosulfide and an alkali metal hydroxide. Additionally, an alkali metal sulfide may be produced from an alkali metal hydrosulfide and an alkali metal hydroxide and may be transferred to a polymerization tank to be used.

Alternatively the alkali metal sulfide used as the sulfidizing agent may be an alkali metal sulfide produced in situ in the reaction system from an alkali metal hydroxide such as lithium hydroxide or sodium hydroxide and hydrogen sulfide. Additionally, an alkali metal sulfide may be produced from an alkali metal hydroxide such as lithium hydroxide or sodium hydroxide and hydrogen sulfide and may be transferred to a polymerization tank to be used.

According to an embodiment of the invention, when there is a partial loss of the sulfidizing agent due to, for example, a dehydration operation, prior to start of a polymerization reaction, the amount of the fed sulfidizing agent indicates a remaining amount of the sulfidizing agent determined by subtracting the loss from an actual fed amount.

Besides, an alkali metal hydroxide and/or an alkaline earth hydroxide may be used together with the sulfidizing agent. Specific examples of the alkali metal hydroxide may preferably include sodium hydroxide, potassium hydroxide, lithium hydroxide, rubidium hydroxide, cesium hydroxide and mixtures of two or more components selected among these alkali metal hydroxides. Specific examples of the alkaline earth hydroxide may include calcium hydroxide, strontium hydroxide and barium hydroxide. Among them, sodium hydroxide is preferably used.

When the alkali metal hydrosulfide is used as the sulfidizing agent, using an alkali metal hydroxide together is especially preferable. The used amount of the alkali metal hydroxide used together may be, for example, not less than 0.95 mol, preferably not less than 1.00 mol and more preferably not less than 1.005 mol per 1 mol of the alkali metal hydrosulfide. The used amount of the alkali metal hydroxide used together may also be not greater than 1.20 mol, preferably not greater than 1.15 mol and more preferably not greater than 1.100 mol.

[Polymerization Solvent]

According to an embodiment of the invention, an organic polar solvent is used as the polymerization solvent. Specific examples include: N-alkyl pyrrolidones such as N-methyl-2-pyrrolidone and N-ethyl-2-pyrrolidone; caprolactams such as N-methyl-ε-caprolactam; aprotic organic solvents such as 1,3,-dimethyl-2-imidazolidinone, N,N-dimethylacetamide, N,N-dimethylformamide, hexamethylphosphoric triamide, dimethyl sulfone and tetramethylene sulfoxide; and mixtures thereof. Any of these organic polar solvents has the high reaction stability and is thus used preferably. Among them, N-methyl-2-pyrrolidone (hereinafter may be abbreviated as NMP) is especially preferably used.

The used amount of the organic polar solvent may be not less than 2.0 mol, preferably not less than 2.25 mol and more preferably not less than 2.5 mol per 1 mol of the sulfidizing agent. The amount of the organic polar solvent used may also be not greater than 10 mol, preferably not greater than 6.0 mol and more preferably not greater than 5.5 mol.

[Molecular Weight Modifier]

According to an embodiment of the invention, a monohalogenated compound (not necessarily aromatic compound) may be used as a molecular weight modifier together with the polyhalogenated aromatic compound described above. The molecular weight modifier herein means a substance used to form terminals of the resulting PPS resin or used to control the polymerization reaction or modify the molecular weight.

[Polymerization Modifier]

According to an embodiment of the invention, one of preferable aspects uses a polymerization modifier in order to control the degree of polymerization. The polymerization modifier herein means a substance having the function of increasing the viscosity of the resulting PPS resin. Specific examples of this polymerization modifier may include carboxylates including alkali metal carboxylates, water, alkali metal chlorides, organic sulfonates, alkali metal sulfates, alkaline earth oxides, alkali metal phosphates and alkaline earth phosphates. Any of these polymerization modifiers may be used alone, or alternatively two or more of these polymerization modifiers may be used in combination. Among them, carboxylates, water and alkali metal chlorides are preferable. More specifically, carboxylates of, for example, sodium and lithium and/or water are especially preferably used.

The above alkali metal carboxylate is a compound expressed by a general formula $R(COOM)_n$ (in the formula, R represents an alkyl group, a cycloalkyl group, an aryl group, an alkyl aryl group or an aryl alkyl group; M represents an alkali metal selected among lithium, sodium, potassium, rubidium and cesium; and n represents an integral number of 1 to 3). The alkali metal carboxylate may be used as a hydrate, an anhydride or an aqueous solution. Specific examples of the alkali metal carboxylate may include lithium acetate, sodium acetate, potassium acetate, sodium propionate, lithium valerate, sodium benzoate, sodium phenylacetate, potassium p-toluate and mixtures thereof.

The alkali metal carboxylate may be obtained by mixing and reacting substantially the same chemical equivalents of an organic acid and one or more compound selected among the group consisting of alkali metal hydroxides, alkali metal carbonates and alkali metal bicarbonates. Among the above alkali metal carboxylates, the lithium salts have high solubility in the reaction system and significant modifier effects but are expensive. The potassium salts, rubidium salts and cesium salts are likely to have insufficient solubility in the reaction system. Accordingly, most preferably used is sodium acetate that is inexpensive and has moderate solubility in the polymerization system.

The used amount of any of these alkali metal carboxylates used as the polymerization modifier may be generally not less than 0.01 mol, preferably not less than 0.1 mol to achieve the higher degree of polymerization, and more preferably not less than 0.2 mol per 1 mol of the fed alkali metal sulfide. The amount of any of these alkali metal carboxylates used as the polymerization modifier may also be generally not greater than 2 mol, preferably not greater than 0.6 mol to achieve the higher degree of polymerization, and more preferably not greater than 0.5 mol. According to an embodiment of the invention, the fed alkali metal sulfide herein is not restricted to an alkali metal sulfide actually fed in the reaction system but includes an alkali metal sulfide, which may be produced in the reaction system using an alkali metal hydrosulfide or hydrogen sulfide as the sulfidizing agent. Additionally, when there is a partial loss of the alkali metal sulfide in a prior process prior to the polymerization reaction, the amount of the fed alkali metal sulfide indicates a remaining amount of the alkali metal sulfide determined by subtracting the loss from the amount of the fed alkali metal sulfide described above.

The added amount of water used as the polymerization modifier may be generally not less than 0.3 mol, preferably not less than 0.6 mol to achieve the higher degree of polymerization, and more preferably not less than 1 mol per 1 mol of the fed alkali metal sulfide. The added amount of water used as the polymerization modifier may also be not greater than 15 mol, preferably not greater than 10 mol to achieve the higher degree of polymerization, and more preferably not greater than 5 mol.

Using two of more of these polymerization modifiers in combination is also allowed as a matter of course. For example, using an alkali metal carboxylate and water together allows high polymerization by the respectively smaller required amounts.

The timing of addition of any of these polymerization modifiers is not especially specified but may be any time during a prior process described later, at the start of polymerization or in the middle of polymerization, and the polymerization modifier may be added in a plurality of additions. When an alkali metal carboxylate is used as the polymerization modifier, however, adding the alkali metal carboxylate at once at the start of the prior process or at the start of polymerization is preferable in light of easy addition. When water is used as the polymerization modifier, on the other hand, adding water in the middle of the polymerization reaction after feeding the polyhalogenated aromatic compound is effective.

[Polymerization Stabilizer]

According to an embodiment of the invention, a polymerization stabilizer may be used, in order to stabilize the polymerization reaction system and prevent side reaction. The polymerization stabilizer contributes to stabilizing the polymerization reaction system and preventing undesired side reaction. One indication of the side reaction is generation of thiophenol. Addition of the polymerization stabilizer can prevent generation of thiophenol. Specific examples of the polymerization stabilizer are compounds such as alkali metal hydroxides, alkali metal carbonates, alkaline earth hydroxides and alkaline earth carbonates. Among them, alkali metal hydroxides such as sodium hydroxide, potassium hydroxide and lithium hydroxide are preferable. The alkali metal carboxylate used as the above polymerization modifier also acts as the polymerization stabilizer and is thus included in one of the polymerization stabilizers used according to an embodiment of the invention. As described above, when the alkali metal hydrosulfide is used as the sulfidizing agent, using an alkali metal hydroxide together is especially preferable. In this case, an excess of the alkali metal hydroxide relative to the sulfidizing agent may also serve as the polymerization stabilizer.

Any of these polymerization stabilizers may be used alone, or alternatively two or more of these polymerization stabilizers may be used in combination. The amount of the polymerization stabilizer may be generally not less than 0.02 mol, preferably not less than 0.03 mol and more preferably not less than 0.04 mol per 1 mol of the fed alkali metal sulfide. The amount of the polymerization stabilizer that is not less than 0.02 mol ensures the sufficient stabilization effect. The amount of the polymerization stabilizer may also be not greater than 0.2 mol, preferably not greater than 0.1 mol and more preferably not greater than 0.09 mol. The amount of the polymerization stabilizer that is not greater than 0.2 mol is economically advantageous and is likely to prevent a decrease in polymer yield.

The timing of addition of the polymerization stabilizer is not especially specified but may be any time during the prior process described later, at the start of polymerization or in the middle of polymerization, and the polymerization stabilizer may be added in a plurality of additions. Adding the polymerization stabilizer at once at the start of the prior process or at the start of polymerization is, however, preferable in light of easy addition.

The following specifically and sequentially describes a prior process, a polymerization reaction process, a recovery process and a post treatment process with respect to the production method of the PPS resin (A) used according to an embodiment of the invention.

[Prior Process]

In the production method of the PPS resin (A) used according to the embodiment of the invention, the sulfidizing agent is generally used in the form of a hydrate. It is here preferable to raise the temperature of a mixture including an organic polar solvent and a sulfidizing agent and thereby remove an excess amount of water out of the system, prior to addition of a polyhalogenated aromatic compound.

As described above, an alkali metal sulfide produced in situ in the reaction system from an alkali metal hydrosulfide and an alkali metal hydroxide or an alkali metal sulfide produced in a different tank from a polymerization tank may also be used as the sulfidizing agent. The method of the production is not specifically restricted. A preferable method may, however, add an alkali metal hydrosulfide and an alkali metal hydroxide to an organic polar solvent under an inert gas atmosphere in a temperature range of ordinary temperature to 150° C. or preferably in a temperature range of ordinary temperature to 100° C. and raise the temperature of the mixture to at least 150° C. or higher or preferably to 180 to 260° C. under ordinary pressure or under reduced pressure, so as to remove the water content. The polymerization modifier may be added at this stage. The reaction may be made by addition of toluene, in order to facilitate removal of the water content.

The amount of water in the reaction system during the polymerization reaction is preferably 0.3 to 10.0 mol per 1 mol of the fed sulfidizing agent. The amount of water in the polymerization system herein is an amount determined by subtracting the amount of water removed out of the polymerization system from the amount of water fed to the polymerization system. The water fed may be in any form, such as water, an aqueous solution or crystallization water.

[Polymerization Reaction Process]

According to an embodiment of the invention, the PPS resin is produced by reaction of the polyhalogenated aromatic compound with the sulfidizing agent in the organic polar solvent in a temperature range of not lower than 200° C. but lower than 290° C.

The polymerization reaction process may start by mixing the organic polar solvent and the sulfidizing agent with the polyhalogenated aromatic compound preferably under an inert gas atmosphere in a temperature range of ordinary temperature to 240° C. or preferably in a temperature range of 100 to 230° C. At this stage, the polymerization modifier may be added. These raw materials may be fed in any arbitrary order or may be fed simultaneously.

The process then raises the temperature of this mixture generally to a range of 200° C. to 290° C. The rate of temperature rise is not specifically restricted. The rate of 0.01 to 5° C./minute may, however, be generally selected, and the range of 0.1 to 3° C./minute is more preferable.

The general process finally raises the temperature of the mixture to the temperature of 250 to 290° C. and keeps the mixture at the temperature generally for 0.25 to 50 hours or preferably for 0.5 to 20 hours.

A method of raising the temperature to 270 to 290° C. after the reaction proceeding for a predetermined time at, for example, 200 to 260° C. at the stage prior to reaching to the final temperature is effective to achieve the higher degree of polymerization. In this case, generally the range of 0.25 hours to 20 hours or preferably the range of 0.25 to 10 hours is selected as the reaction time at 200 to 260° C.

Additionally, in some cases, polymerization at multiple stages may be effective to obtain a polymer having the higher degree of polymerization. The polymerization at the multiple stages is effective at the time when the conversion ratio of the polyhalogenated aromatic compound in the system at 245° C. reaches 40 mol % or higher or preferably 60 mol %.

The conversion ratio of the polyhalogenated aromatic compound (abbreviated as PHA herein) is a value calculated by the following equations. The remaining amount of PHA may be determined by gas chromatography method.

(a) In the case of addition of an excess amount in molar ratio of the polyhalogenated aromatic compound relative to the alkali metal sulfide:

Conversion ratio=[feeding amount of PHA (mol)−remaining amount of PHA (mol)]/[feeding amount of PHA (mol)−excess amount of PHA (mol)]

(b) In the case other than the above case (a):

Conversion ratio=[feeding amount of PHA (mol)−remaining amount of PHA (mol)]/[feeding amount of PHA (mol)]

[Recovery Process]

In the production method of the PPS resin (A) used according to the embodiment of the invention, a recovery process of recovering a solid substance from a polymerization reactant including a polymer and the solvent is performed after the end of polymerization. Any of known recovery methods may be employed to recover the PPS resin used according to the embodiment of the invention.

For example, after the end of the polymerization reaction, an available method may slowly cool down the polymerization reactant to allow crystallization and deposition of a polymer and recovery as the particulate polymer. The slow cooling speed of this method is not specifically restricted, but is generally 0.1° C./minute to 3° C./minute. There is no need to slowly cool down the polymerization reactant at a constant speed over the entire slow cooling process. For example, an applicable method may slowly cool down the polymerization reactant at the speed of 0.1 to 1° C./minute until crystallization and deposition of the polymer particles and then slowly cool down the polymerization reactant at the speed of not lower than 1° C./minute.

One of the preferable methods performs the recovery described above under a rapid cooling condition, and a flash method is one preferable method of the recovery. The flash method flashes the polymerization reactant from the state of high temperature and high pressure (generally not lower than 250° C. and not less than 8 kg/cm$^2$) into an atmosphere of ordinary pressure or reduced pressure and thereby recovers the polymer in the powdery form simultaneously with recovery of the solvent. Flashing herein means ejecting the polymerization reactant from a nozzle. More specifically, the atmosphere into which the polymerization reactant is flashed is, for example, nitrogen or steam in ordinary pressure, and the range of 150° C. to 250° C. is generally selected as the flashing temperature.

[Post Treatment Process]

The PPS resin (A) used according to the embodiment of the invention may be subjected to acid treatment, hot water treatment or washing with an organic solvent as the post treatment process, after production of the PPS resin through the polymerization and the recovery process described above.

The acid treatment may be performed as described below. The acid used for the acid treatment of the PPS resin according to an embodiment of the invention is not specifically restricted but may be any acid that does not have the action of degrading the PPS resin. Available examples of the acid include acetic acid, hydrochloric acid, sulfuric acid, phosphoric acid, silicic acid, carbonic acid and propionic acid. Among them, acetic acid and hydrochloric acid are more preferably used. An acid that degrades or deteriorates the PPS resin, such as nitric acid is, however, unfavorable.

An available method of the acid treatment is, for example, a method of soaking the PPS resin in the acid or an acid aqueous solution, with adequately stirring or heating as needed basis. For example, when acetic acid is used as the acid, the method of soaking the PPS resin powder in an acetic acid aqueous solution of pH 4 heated to 80 to 200° C. and stirring the resin-soaked solution for 30 minutes achieves the sufficient effect. The pH after the acid treatment may be 4 or higher, for example, about pH 4 to 8. The PPS resin subjected to the acid treatment is preferably washed with water or hot water several times, for the purpose of removal of the remaining acid or salt. The water used for washing is preferably distilled water or deionized water, since distilled water or deionized water does not degrade the desired effect of chemical modification of the PPS resin by the acid treatment.

The hot water treatment may be performed as described below. In the process of hot water treatment of the PPS resin used according to the embodiment of the invention, the temperature of hot water is not lower than 100° C., is preferably not lower than 120° C., is more preferably not lower than 150° C. and is furthermore preferably not lower than 170° C. The temperature of lower than 100° C. gives little desired effect of chemical modification of the PPS resin and is thus unfavorable.

In order to achieve the desired effect of chemical modification of the PPS resin by the hot water washing according to the embodiment of the invention, the water used is preferably distilled water or deionized water. The operation of the hot water treatment is not specifically restricted, but, for example, a method of placing a predetermined amount of the PPS resin in a predetermined amount of water and heating the PPS resin in water with stirring in a pressure vessel or a method of continuously performing the hot water treatment may be employed for the hot water treatment. As the ratio of the PPS resin to water, the greater portion of water is preferable. The liquor ratio of not greater than 200 g of the PPS resin to 1 liter of water is, however, generally selected.

Degradation of the terminal groups is unfavorable, so that a desired method performs the hot water treatment under an inert atmosphere, in order to avoid degradation of the terminal groups. Additionally, it is preferable to wash the PPS resin, which has been subjected to this hot water treatment operation, with hot water several times, for the purpose of removal of the remaining components.

The organic solvent washing may be performed as described below. The organic solvent used for washing the PPS resin according to the embodiment of the invention is not specifically restricted but may be any organic solvent that does not have the action of degrading the PPS resin. Available examples of the organic solvent include: nitrogen-containing polar solvents such as N-methyl-2-pyrrolidone, dimethylformamide, dimethylacetamide, 1,3-dimethylimidazolidinone, hexamethylphosphoramide and piperazines; sulfoxide/sulfone solvents such as dimethyl sulfoxide, dimethyl sulfone and sulfolane; ketone solvents such as acetone, methyl ethyl ketone, diethyl ketone and acetophenone; ether solvents such as dimethyl ether, dipropyl ether, dioxane and tetrahydrofuran; halogen solvents such as chloroform, methylene chloride, trichloroethylene, ethylene dichloride, perchloroethylene, monochloroethane, dichloroethane, tetrachloroethane, perchloroethane and chlorobenzene; alcohol/phenol solvents such as methanol, ethanol, propanol, butanol, pentanol, ethylene glycol, propylene glycol, phenol, cresol, polyethylene glycol and polypropylene glycol; and aromatic hydrocarbon solvents such as benzene, toluene and xylene. Among these organic solvents, using, for example, N-methyl-2-pyrrolidone, acetone, dimethylformamide and chloroform is especially preferable. Additionally, any of these organic solvents may be used alone or alternatively may be used as a mixture of two or more of the organic solvents.

An available method of the organic solvent washing is, for example, a method of soaking the PPS resin in the organic solvent, with adequately stirring or heating as needed basis. The washing temperature for washing the PPS resin with the organic solvent is not specifically restricted, but any temperature in ordinary temperature to about 300° C. may be selected. The higher washing temperature is likely to have the higher washing efficiency, but the washing temperature in ordinary temperature to 150° C. generally achieves the sufficient effect. Another available method may perform the organic solvent washing under pressure in a pressure vessel at the temperature of not lower than the melting point of the organic solvent. The washing time is also not specifically restricted. The washing time depends on the washing conditions, but washing for not less than 5 minutes generally achieves the sufficient effect in the case of batch washing. Continuous washing is also available.

According to an embodiment of the invention, the polyphenylene sulfide resin obtained by the above method may further be subjected to washing with water containing an alkaline earth salt.

The following method may be employed as a specific method of washing the polyphenylene sulfide resin with water containing an alkaline earth salt. The alkaline earth salt is not specifically restricted, but preferable examples include: alkaline earth salts of water-soluble carboxylic acids such as calcium acetate and magnesium acetate; and alkaline earth hydroxides such as calcium hydroxide and magnetic hydroxide. Especially preferable are alkaline earth salts of water-soluble carboxylic acids such as calcium acetate and magnesium acetate. The temperature of the water is preferably in room temperature to 200° C. and is more preferably in 50 to 90° C. The used amount of the alkaline earth salt contained in the above water is preferably 0.1 g to 50 g and is more preferably 0.5 g to 30 g relative to 1 kg of the dried polyphenylene sulfide resin. The washing time is preferably not less than 0.5 hours and is more preferably not less than 1.0 hour. The preferable washing liquor ratio (weight of the warm water containing the alkaline earth salt used per unit weight of the dried polyphenylene sulfide resin) depends on the washing time and the temperature. The used amount of the warm water containing the above alkaline earth salt is preferably not less than 5 kg and is more preferably not less than 10 kg relative to 1 kg of the dried polyphenylene sulfide. The upper limit of the washing liquor ratio is not specifically restricted and may be a high value. In order to achieve the balance between the used amount and the achieved effect, however, the washing liquor ratio is preferably not greater than 100 kg. The warm water washing may be performed a plurality of times.

The PPS resin (A) used according to an embodiment of the invention may be further subjected to high polymerization by a thermal oxidation cross-linking process of heating under an oxygen atmosphere and heating with addition of a cross-linking agent such as a peroxide after completion of polymerization.

When dry heat treatment is performed for the purpose of high polymerization by thermal oxidation cross-linking, the temperature of the dry heat treatment is preferably not lower than 160° C. and is more preferably not lower than 170° C. The temperature of the dry heat treatment is also preferably not higher than 260° C. and is more preferably not higher than 250° C. The oxygen concentration is preferably not less than 5% by volume and is more preferably not less than 8% by volume. The upper limit of the oxygen concentration is not specifically restricted but may be about 50% by volume. The processing time is preferably not less than 0.5 hours, is more preferably not less than 1 hour and is furthermore preferably not less than 2 hours. The processing time is also preferably not greater than 100 hours, is more preferably not greater than 50 hours and is furthermore preferably not greater than 25 hours. The device for heat treatment may be a general hot air drying machine, a rotary heating device or a heating device with stirring blades, but using the rotary heating device or the heating device with stirring blades is more preferable to enable efficient and more homogeneous treatment.

From the standpoint of satisfying both the high weld strength and the excellent melt flowability, however, introduction of the cross-linking structure is not particularly preferable, but the linear PPS is preferable.

The dry heat treatment may be performed with a view to preventing thermal oxidation cross-linking and removing the volatile component. The temperature of the dry heat treatment is preferably not lower than 130° C. and is more preferably not lower than 160° C. The temperature of the dry heat treatment is also preferably not higher than 250° C. The oxygen concentration in this case is preferably less than 5% by volume and is more preferably less than 2% by volume. The processing time is preferably not less than 0.5 hours and is more preferably not less than 1 hour. The processing time is also preferably not greater than 50 hours, is more preferably not greater than 20 hours and is furthermore preferably not greater than 10 hours. The device for heat treatment may be a general hot air drying machine, a rotary heating device or a heating device with stirring blades, but using the rotary heating device or the heating device with stirring blades is more preferable to enable efficient and more homogeneous treatment.

According to an embodiment of the invention, using the PPS resin having the ash content in the PPS reduced to or below 0.2% by weight by deionization process is preferable to achieve the better toughness and the better molding processability. Available examples of the specific method of this deionization process include acid aqueous solution washing process, hot water washing process, organic solvent washing process and combinations of any two or more method selected among these processes. The ash content herein is determined by the following method. The method weighs 5 g of the dried PPS bulk powder in a crucible and burns the PPS bulk powder to black block object on an electric heater. The method subsequently continues burning the block object in an electric oven set to 550° C. until the carbide is burned out. After cooling down the residue in the desiccators, the method then measures the weight of the residue and compares the measured weight with the initial weight to calculate the ash content.

Examples of products of the preferable PPS resin include M2888, M2588, M2088, T1881, E2280, E2180, E2080, GR01, L2840, L2120, M2100, M2900 and L4230 manufactured by Toray Industries, Inc.

(2) Olefin Elastomer

The olefin elastomer (B) used according to an embodiment of the invention is a polymer material having the rubber-like properties but showing elasticity at ordinary temperature and is not specially limited to examples given below. Especially preferably used is a copolymer of ethylene and a compound selected among α-olefins having 3 to 12 carbon atoms. Specific examples of the α-olefins having 3 to 12 carbon atoms include propylene, 1-butene, 1-pentene, 1-hexene, 1-heptene, 1-octene, 1-nonene, 1-decene, 1-undecene and 1-dodecene. Among these α-olefins, copolymers using α-olefins having 4 to 8 carbon atoms are especially preferable for improvement of the mechanical strength and further improvement of the modification effect.

The copolymerization type of the olefin elastomer (B) used according to an embodiment of the invention may be any of random copolymerization, block copolymerization and graft copolymerization, but the random copolymerization and the block copolymerization are especially preferably used. The olefin elastomer (B) of random copolymerization is obtained by a versatile method using a metallocene catalyst consisting of a cyclopentadienyl derivative of a IV group metal such as titanium or zirconium and a promoter or a Ziegler catalyst. The olefin elastomer (B) of block copolymerization may be obtained by a production method disclosed in JP 2008-545016A and is produced by combination of a catalyst for highly selectively polymerizing ethylene, a catalyst for highly selectively polymerizing an α-olefin and a reversible chain transfer agent. Additionally, the olefin elastomer (B) of block copolymerization has the higher melting point than the olefin elastomer (B) of random copolymerization and thus further reduces the gas emission and the mold deposit in the course of melt kneading the olefin elastomer (B) of block copolymerization with the PPS resin or in the course of molding the PPS resin composition produced by the melt kneading.

The olefin elastomer (B) usable according to an embodiment of the invention preferably has a melt flow rate (hereinafter abbreviated as MFR) of not less than 0.01 g/10 minutes, wherein the MFR is measured at 190° C. and 2160 g load conforming to ASTM-D 1238. The MFR of not less than 0.01 g/10 minutes ensures the good flowability of the resin composition. The above MFR is also preferably not greater than 100 g/10 minutes, is more preferably not greater than 10 g/10 minutes and is furthermore preferably not greater than 0.5 g/10 minutes. The MFR of not greater than 100 g/10 minutes prevents a decrease in shock property of the resin composition, although this depends on the shape of the product.

The mixing amount of the olefin elastomer (B) used according to an embodiment of the invention is selected in the range of 1 to 100 parts by weight relative to 100 parts by weight of the PPS resin. The mixing amount of the olefin elastomer (B) that is less than 1 part by weight has little effect of improving the toughness, for example, tensile fracture elongation and impact strength. The mixing amount of the olefin elastomer (B) may be greater than 1 part by weight and is preferably not less than 2 parts by weight and is furthermore preferably not less than 3 parts by weight relative to 100 parts by weight of the PPS resin. The mixing amount of the olefin elastomer (B) that is greater than 100 parts by weight significantly interferes with the heat resistance, the chemical resistance and the hot water resistance which the PPS resin inherently has. The mixing amount of the olefin elastomer (B) may also be less than 100 parts by weight and is preferably not greater than 70 parts by weight and is furthermore preferably not greater than 50 parts by weight relative to 100 parts by weight of the PPS resin.

According to an embodiment of the invention, it is useful to mix a functional group-containing olefin elastomer that contains at least one functional group selected among an epoxy group, an acid anhydride group, a carboxyl group and its salt and a carboxylate ester, as the olefin elastomer (B). In the case of mixing the functional group-containing olefin elastomer, an olefin elastomer that does not contain any functional group may also be added simultaneously. Mixing the functional group-containing olefin elastomer described above is effective for improving the compatibility with the PPS resin.

An embodiment of the functional group-containing olefin elastomer is an olefin elastomer copolymerized with an epoxy group-containing monomer. Especially preferable is an epoxy group-containing olefin elastomer produced by copolymerizing an α-olefin with an α,β-unsaturated acid glycidyl ester.

Available examples of the α-olefin in the functional group-containing olefin elastomer include ethylene, propylene, 1-butene, 4-methyl-1-pentene, 1-hexene, 1-decene and 1-octene, and ethylene is especially preferably used. Additionally, two or more of these α-olefins may be used in combination.

The α,β-unsaturated acid glycidyl ester in the functional group-containing olefin elastomer is a compound expressed by a general formula:

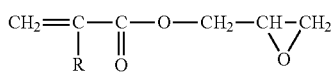
[Chem. 3]

(wherein R represents hydrogen atom or a lower alkyl group having any one of 1 to 20 carbon atoms). Specific examples of the α,β-unsaturated acid glycidyl ester include glycidyl acrylate, glycidyl methacrylate and glycidyl ethacrylate. Among them, glycidyl methacrylate is used preferably.

The type of copolymerization of the α-olefin with the α,β-unsaturated acid glycidyl ester in the functional group-containing olefin elastomer usable according to an embodiment of the invention may be any of random copolymerization, alternating copolymerization, block copolymerization and graft copolymerization.

An epoxy group-containing olefin elastomer including a monomer (3) expressed by a general formula given below in addition to an α-olefin (1) and an α,β-unsaturated acid glycidyl ester (2) as essential components may also be used preferably as the functional group-containing olefin elastomer usable according to an embodiment of the invention.

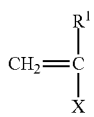
[Chem. 4]

(wherein R1 represents hydrogen or a lower alkyl group; X represents a group selected among a —COOR2 group, a —CN group and an aromatic group; and R2 represents an alkyl group having any one of 1 to 12 carbon atoms.)

The details of the α-olefin (1) and the α,β-unsaturated acid glycidyl ester (2) used in this olefin elastomer are the same as described above.

Specific examples of the monomer (3), on the other hand, include: α, β-unsaturated carboxylic acid alkyl esters such as methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, t-butyl methacrylate and isobutyl methacrylate; acrylonitrile; styrene; α-methylstyrene, styrene having an aromatic ring substituted with an alkyl group and an acrylonitrile-styrene copolymer. Two or more of these monomers may be used in combination.

The functional group-containing olefin elastomer usable according to an embodiment of the invention may have any copolymerization type among random copolymerization, alternating copolymerization, block copolymerization and graft copolymerization of the α-olefin (1), the α, β-unsaturated acid glycidyl ester (2) and the monomer (3). The copolymer may be obtained by combination of two or more different copolymerization types, for example, a graft copolymer of the monomer (3) with a random copolymer of the α-olefin (1) and the α,β-unsaturated acid glycidyl ester (2).

By considering the influences on the target effects, such as the influences on the polymerizability, gelation, heat resistance, flowability and strength, the copolymerization ratio of this functional group-containing olefin elastomer is preferably selected in the range of α-olefin (1)/α, β-unsaturated acid glycidyl ester (2)=60 to 99% by weight/40 to 1% by weight. Additionally, the copolymerization ratio of the monomer (3) is preferably selected in the range of 5 to 60% by weight of the monomer (3) relative to the total amount of 95 to 40% by weight of the α-olefin (1) and the α,β-unsaturated acid glycidyl ester (2) (wherein the total of (1), (2) and (3) is equal to 100% by weight).

Another preferable embodiment of the epoxy group-containing olefin copolymer is an epoxidized diene block copolymer.

This epoxidized diene block copolymer is obtained by epoxidizing the double bond derived from a conjugated diene compound of a block copolymer or a partially hydrogenated block copolymer. The block copolymer as the base substance of the epoxidized diene block copolymer is a block copolymer consisting of a polymer block A mainly composed of at least one aromatic vinyl compound and a polymer block B mainly composed of at least one conjugated diene compound, for example, an aromatic vinyl compound-conjugated diene compound block copolymer having the structure such as A-B, A-B-A, (A-B)-4-Si, A-B-A-B-A. The partially hydrogenated block copolymer is, on the other hand, obtained by hydrogenation of the block copolymer. The following describes the block copolymer and the partially hydrogenated block copolymer more in detail.

In this block copolymer, the content of the aromatic vinyl compound may be not less than 5% by weight and is preferably not less than 10% by weight. The content of the aromatic vinyl compound may also be less than 95% by weight and is preferably not greater than 60% by weight and is more preferably not greater than 50% by weight. The polymer block A mainly composed of the aromatic vinyl compound may have the structure of a homopolymer block of the aromatic vinyl compound or the structure of a copolymer block of the aromatic vinyl compound and a conjugated diene compound containing not less than 50% by weight or preferably not less than 70% by weight of the aromatic vinyl compound. The polymer block B mainly composed of the conjugated diene compound may, on the other hand, have the structure of a homopolymer block of the conjugated diene compound or the structure of a copolymer block of the conjugated diene compound and an aromatic vinyl compound containing not less than 50% by weight or preferably not less than 70% by weight of the conjugated diene compound. In these polymer block A mainly composed of the aromatic vinyl compound and polymer block B mainly composed of the conjugated diene compound, the distribution of the aromatic vinyl compound or the distribution of the conjugated diene compound in the molecular chain of each polymer block may be a random distribution, a tapered distribution (where the monomer component increases or decreases along the molecular chain), a partially blocked distribution or any arbitrary combination thereof. When the block copolymer has two or more polymer blocks A mainly composed of the aromatic vinyl compound and/or two or more polymer blocks B mainly composed of the conjugated diene compound, the respective polymer blocks may have an identical structure or may have different structures.

As the aromatic vinyl compound of the block copolymer, one compound or two or more compounds may be selected among, for example, styrene, α-methylstyrene, vinyl toluene, p-tert-butylstyrene and 1,1-diphenyl ethylene. Among these compounds, styrene is preferable. As the conjugated diene compound, one compound or two or more compounds may be selected among, for example, butadiene, isoprene, 1,3-pentadiene and 2,3-dimethyl-1,3-butadiene. Among these compounds, butadiene, isoprene and a combination thereof are preferable. Additionally, the polymer block B mainly composed of the conjugated diene compound may have a micro structure in the block that is arbitrarily selected. For example, a polybutadiene block has the 1,2-vinyl bond structure of preferably not less than 5% and especially preferably not less than 10%. The polybutadiene block also has the 1,2-vinyl bond structure of preferably not greater than 65% and especially preferably not greater than 50%.

In the above epoxidized diene block copolymer, the number-average molecular weight of the block copolymer having the above structure may be generally not less than 5,000 and is preferably not less than 10,000 and is furthermore preferably not less than 30,000. The number-average molecular weight may also be not greater than 1,000,000, preferably not greater than 800,000 and furthermore preferably not greater than 500,000. Additionally, as the molecular weight distribution of the block copolymer having the above structure, the [ratio (Mw/Mn) of the weight-average molecular weight (Mw) to the number-average molecular weight (Mn)] is not greater than 10. The number-average molecular weight (Mn) and the weight-average molecular weight (Mw) herein are values determined by gel permeation chromatography (GPC) method. Furthermore, the molecular structure of the block copolymer may be any of a linear structure, a branched structure, a radial structure and any combinations thereof.

Any production method of producing the block copolymer having the above structure may be employed for production of these block copolymers.

The partially hydrogenated block copolymer is, on the other hand, obtained by hydrogenation of the aromatic vinyl compound-conjugated diene compound block copolymer described above. The production method of this hydrogenated block copolymers is not specifically limited but may be any method that does not degrade the properties of the PPS resin composition according to the embodiment of the invention.

Specifically, the epoxidized diene block copolymer usable as one of the functional group-containing olefin elastomers is obtained by reaction of the block copolymer or the partially hydrogenated block copolymer having the above structure with an epoxidizing agent to epoxidize the aliphatic double bond based on the conjugated diene compound. The production method of the epoxidized diene block copolymer used according to an embodiment of the invention is not specifically limited but may be any method that does not degrade the properties of the PPS resin composition according to the embodiment of the invention.

An olefin elastomer having a carboxyl group, its salt, a carboxylate group or an acid anhydride group may also be used as one of the functional group-containing olefin elastomers. Available examples include copolymers of ethylene and α-olefins, such as ethylene-butene copolymer, ethylene-octene copolymer and ethylene-hexene copolymer. Other available examples include polyethylene, polypropylene, polystyrene, ethylene-propylene copolymer, polybutene, ethylene-propylene-diene copolymer, styrene-butadiene copolymer, styrene-butadiene-styrene block copolymer (SBS), styrene-isoprene-styrene block copolymer (SIS), polybutadiene, butadiene-acrylonitrile copolymer, polyisoprene, butene-isoprene copolymer, styrene-ethylene-butylene-styrene block copolymer (SEBS) and styrene-ethylene-propylene-styrene block copolymer (SEPS). Further available examples include copolymerized olefin elastomers obtained by copolymerization of the above polyolefin elastomer, such as the copolymer of ethylene and the α-olefin, with an acid anhydride such as maleic acid, succinic acid, fumaric acid, acrylic acid, methacrylic acid or vinyl acetate, a carboxylic acid such as acrylic acid, methacrylic acid or vinyl acetate or its salt such as a Na, Zn, K, Ca or Mg salt, or a carboxylate ester such as methyl acrylate, methyl methacrylate, ethyl acrylate, ethyl methacrylate, propyl acrylate, propyl methacrylate, butyl acrylate or butyl methacrylate. More specifically, available examples include: olefin-(meth)acrylate ester copolymer such as ethylene-methyl acrylate copolymer, ethylene-ethyl acrylate copolymer, ethylene-n-propyl acrylate copolymer, ethylene-isopropyl acrylate copolymer, ethylene-n-butyl acrylate copolymer, ethylene-t-butyl acrylate copolymer, ethylene-isobutyl acrylate copolymer, ethylene-ethyl methacrylate copolymer, ethylene-n-propyl methacrylate copolymer, ethylene-isopropyl methacrylate copolymer, ethylene-n-butyl methacrylate copolymer, ethylene-t-butyl methacrylate copolymer, and ethylene-isobutyl methacrylate copolymer; (meth)acrylate ester-acrylonitrile copolymers such as methyl acrylate-acrylonitrile copolymer, methyl methacrylate-acrylonitrile copolymer, propyl acrylate-acrylonitrile copolymer, propyl methacrylate-acrylonitrile copolymer, butyl acrylate-acrylonitrile copolymer and butyl methacrylate-acrylonitrile copolymer; ethylene-(meth)acrylic acid copolymers and their metal salts such as Na, Zn, K, Ca and Mg salts; ethylene-maleic anhydride copolymer; ethylene-butene-maleic anhydride copolymer; ethylene-propylene-maleic anhydride copolymer; ethylene-hexene-maleic anhydride copolymer; ethylene-octene-maleic anhydride copolymer; propylene-maleic anhydride copolymer; and maleic anhydride-modified SBS, SIS, SEBS, SEPS and ethylene ethyl acrylate copolymer.

The copolymerization type of these functional group-containing olefin elastomers is not specifically limited but may be any copolymer type such as random copolymer, graft copolymer or block copolymer.

Two or more different functional group-containing olefin elastomers may be used in combination as the functional group-containing olefin elastomer containing at least one functional group selected among epoxy group, acid anhydride group, carboxyl group and its salt and carboxylate ester group described above.

The mixing ratio (weight ratio) of the ethylene-α-olefin elastomer to the functional group-containing olefin elastomer is preferably 28/2 to 10/20 and is especially preferably 25/5 to 15/15. Mixing the ethylene-α-olefin elastomer and the functional group-containing olefin elastomer in a preferable range achieves the excellent effect of improving the toughness and ensures the high flowability during molding and thereby the excellent molding processability.

The total mixing amount of the ethylene-α-olefin elastomer and the functional group-containing olefin elastomer is 1 to 100 parts by weight, is preferably in the range of 2 to 70 parts by weight and is furthermore preferably 3 to 50 parts by weight relative to 100 parts by weight of the polyphenylene sulfide resin. The excess mixing amount results in reducing the heat resistance, the chemical resistance, the hot water resistance and furthermore significantly reducing the molding processability due to the gas emission during molding. The insufficient mixing amount, on the other hand, does not achieve the effect of improving the toughness at low temperatures.

(3) Carboxylic Acid Amide Wax

The carboxylic acid amide wax used according to an embodiment of the invention is a carboxylic acid amide wax obtained by reaction of a higher aliphatic monocarboxylic acid, a polybasic acid and a diamine. Aliphatic monocarboxylic acids and hydroxycarboxylic acids having 10 or more carbon atoms are preferably used as the higher aliphatic monocarboxylic acid. Specific examples include lauric acid, myristic acid, palmitic acid, stearic acid, oleic acid, linoleic acid, behenic acid, montanic acid and 12-hydroxystearic acid. Among them, more preferable are saturated aliphatic monocarboxylic acids and hydroxycarboxylic acids having 16 or more carbon atoms, such as palmitic acid, stearic acid, behenic acid, montanic acid and 12-hydroxystearic acid. Additionally, two or more of these higher aliphatic monocarboxylic acids may be used in combination.

The polybasic acid is a dibasic or higher polybasic carboxylic acid. Specific examples include: aliphatic dicarboxylic acids such as malonic acid, succinic acid, adipic acid, sebacic acid, pimelic acid and azelaic acid; aromatic dicarboxylic acids such as phthalic acid, terephthalic acid and isophthalic acid; and alicyclic dicarboxylic acids such as cyclohexyl dicarboxylic acid and cyclohexyl succinic acid. Two or more of these polybasic carboxylic acids may be used in combination. Among them, succinic acid, adipic acid, sebacic acid and pimelic acid are especially preferable.

Specific examples of the diamine include ethylenediamine, 1,3-diaminopropane, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, m-xylylenediamine, p-xylylenediamine, tolylenediamine, phenylenediamine and isophorone diamine. Two or more of these diamines may be used in combination. Among them, ethylenediamine is especially preferable.

The mixing ratio of the polybasic acid to the higher aliphatic monocarboxylic acid is preferably not less than 0.18 mol and more preferably not less than 0.2 mol of the polybasic acid to 2 mol of the higher aliphatic monocarboxylic acid. The mixing ratio of the polybasic acid is also preferably not greater than 1.0 mol. The mixing ratio of the diamine to the higher aliphatic monocarboxylic acid is preferably not less than 1.0 mol and more preferably not less than 1.2 mol of the diamine to 2 mol of the higher aliphatic monocarboxylic acid. The mixing ratio of the diamine is also preferably not greater than 2.2 mol and more preferably not greater than 2.0 mol.

The carboxylic acid amide wax used according to an embodiment of the invention is produced by a dehydration condensation reaction of the higher aliphatic monocarboxylic acid, the polybasic acid and the diamine by heating. In many cases, the product obtained by this dehydration condensation reaction is a mixture of a product consisting of the higher aliphatic monocarboxylic acid, the polybasic acid and the diamine and a product consisting of only the higher aliphatic monocarboxylic acid and the diamine without including the polybasic acid. The production ratio varies depending on the synthesis conditions, for example, the feed molar ratio of the respective components for synthesis. According to an embodiment of the invention, the carboxylic acid amide wax more preferably used has the ratio of 10 to 70% by weight of the reaction product, which is the reactant consisting of only the higher aliphatic monocarboxylic acid and the diamine but does not include the polybasic acid, relative to the entire carboxylic acid amide wax.

The percent by weight of this reaction product, which is the reactant consisting of only the higher aliphatic monocarboxylic acid and the diamine but does not include the polybasic acid, is determined by differential scanning calorimetry. More specifically, the percent by weight of the reaction product is determined by comparison between the melting heat quantity of a peak, which appears during a second scan (during a second temperature rise after a temperature rise and a subsequent temperature fall) of the carboxylic acid amide wax as the sample and corresponds to the reaction product that is the reactant consisting of only the higher aliphatic monocarboxylic acid and the diamine but does not include the polybasic acid, and the melting heat quantity obtained by the same method with respect to a separately available pure compound, which is the reactant consisting of only the higher aliphatic monocarboxylic acid and the diamine but does not include the polybasic acid, as the sample.

(4) Carboxylic Acid Amide Wax Mixture

The carboxylic acid amide wax mixture (C) used according to an embodiment of the invention includes 0.01 to 5 parts by weight of an antioxidant relative to 100 parts by weight of the carboxylic acid amide wax. The antioxidant that is to be mixed with the carboxylic acid amide wax is more preferably added to the carboxylic acid amide wax that is solely in the molten state or that is dissolved in a solution, in order to prevent easy separation from the carboxylic acid amide wax. When the antioxidant is added in the course of melt kneading with the PPS resin (A) and the olefin elastomer (B) or in the course of molding, the antioxidant does not selectively act on the carboxylic acid amide wax and accordingly does not achieve the effects of reducing the gas emission and the mold deposit derived from the carboxylic acid amide wax. It is, on the other hand, not preferable to add the antioxidant prior to the synthesis of the carboxylic acid amide wax, in other words, prior to dehydration condensation of the higher aliphatic monocarboxylic acid, the polybasic acid and the diamine, since the function of the antioxidant is inactivated by, for example, thermal decomposition. According to an embodiment of the invention, it is thereby important to melt knead the PPS resin (A) and the olefin elastomer (B) and produce the PPS resin composition after addition of the antioxidant to the carboxylic acid amide wax in the molten state or dissolved in a solution.

For example, phosphorus antioxidants, hindered phenol antioxidants, sulfur antioxidants and amine antioxidants may be used for the antioxidant that is to be mixed with the carboxylic acid amide wax. Two or more of these antioxidants may be used in combination. More preferable are phosphorus antioxidants and/or hindered phenol antioxidants.

The above phosphorus antioxidant is not specifically limited, but it is possible to use any of phosphorus antioxidants and mixtures thereof selected among, for example, tetrakis (2,4-di-t-butylphenyl)-4,4'-biphenylene phosphonite, bis(2,6-di-t-butyl-4-methylphenyl)pentaerythritol diphosphite, 2,2-methylenebis(4,6-di-t-butylphenyl)octyl phosphite, triphenyl phosphite, tris(2,4-di-t-butylphenyl)phosphite, diphenyl isodecyl phosphite, phenyl diisodecyl phosphite, 4,4-butylidene-bis(3-methyl-6-t-butylphenyl-di-tridecyl) phosphite, cyclic neopentane tetraylbis(octadecyl phosphite), cyclic neopentane tetraylbis(2,6-di-t-butyl-4-methylphenyl)phosphite, tris(nonylphenyl)phosphite, diisodecyl pentaerythritol diphosphite, distearyl pentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanth rene-10-oxide and 10-desiloxy-9,10-dihydro-9-oxa-10-phosphaphenanthrene. More preferable is to use any of phosphorous antioxidants having alkyl group having 10 or more carbon atoms and mixtures thereof selected among, for example, diphenyl isodecyl phosphite, phenyl diisodecyl phosphite, 4,4-butylidene-bis(3-methyl-6-t-butylphenyl-di-tridecyl)phosphite, cyclic neopentane tetraylbis(octadecyl phosphite), cyclic neopentane tetraylbis(2,6-di-t-butyl-4-methylphenyl)phosphite, tris (nonylphenyl)phosphite, diisodecyl pentaerythritol diphosphite, distearyl pentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-desiloxy-9,10-dihydro-9-oxa-10-phosphaphenanthrene and 3,9-bis[2,6-bis(1,1-dimethylethyl)-4-methylphenoxy]-2,4,8,10-tetraoxa-3,9-di phosphaspiro[5,5]undecane.

The above hindered phenol antioxidant is not specifically limited, but it is possible to use any of hindered phenol antioxidants and mixtures thereof selected among, for example, triethylene glycol bis[3-(3-t-butyl-5-methyl-4-hydroxyphenyl)propionate, 4,4'-butylidene-bis(3-methyl-6-t-butylphenol), 1,6-hexanediol-bis[3-(3,5-di-t-butyl-4-hydroxyphenyl)propionate, 2,4-bis-(n-octylthio)-6-(4-hydroxy-3,5-di-t-butylanilino)-1,3,5-triazine, pentaerythrityl-tetrakis[3-(3,5-di-t-butyl-4-hydroxyphenyl)propionate], 2,2-thiodiethylenebis[3-(3,5-di-t-butyl-4-hydroxyphenyl)propionate], octadecyl-3-(3,5-di-t-butyl-4-hydroxyphenyl)propionate, 2,2-thio-bis(4-methyl-6-t-butylphenyl), N,N'-hexamethylene-bis(3,5-di-t-butyl-4-hydroxy-hydrocinnamamide), 3,5-di-t-butyl-4-hydroxybenzylphosphonate diethyl ester, 1,3,5-trimethyl-2,4,6-tris(3,5-di-t-butyl-4-hydroxybenzyl)benzene, calcium [bis(ethyl 3,5-di-t-butyl-4-hydroxybenzylsulfonate)], tris-(3,5-di-t-butyl-4-hydroxybenzyl)isocyanurate, 2,6-di-t-butyl-p-cresol, butylated hydroxyanisole, 2,6-di-t-butyl-4-ethylphenol, stearyl-β-(3,5-di-t-butyl-4-hydroxyphenyl)propionate, 2,2'-methylenebis-(4-ethyl-6-t-butylphenol), 4,4'-thiobis-(3-methyl-6-t-butylphenol), octylated diphenylamine, 2,4-bis[(octylthio)methyl]-O-cresol, isooctyl-3-(3,5-di-t-butyl-4-hydroxyphenyl)propionate, 4,4'-butylidenbis(3-methyl-6-t-butylphenol), 3,9-bis[1,1-dimethyl-2-[β-(3-t-butyl-4-hydroxy-5-methylphenyl)propionyloxy]ethyl]-2,4,8,10-tetraoxaspiro[5,5]undecane, 3-(1,1-dimethylethyl)-4-hydroxy-5-methyl-2,4,8,10-tetraoxaspiro[5,5]undeca ne-3,9-diylbis(2,2-dimethyl-2,1-ethanediyl)ester of benzenepropanoic acid, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis(4'-hydroxy-3'-t-butylphenyl)butyric acid]glycol ester, 1,3,5-tris(3',5'-di-t-butyl-4'-hydroxybenzyl)-sec-triazine-2,4,6-(1H,3H, 5H)trione and d-α-tocopherol. More preferable is to use any of hindered phenol antioxidants having alkyl group having 10 or more carbon atoms and mixtures thereof selected among, for example, octadecyl-3-(3,5-di-t-butyl-4-hydroxyphenyl)propionate, stearyl-β-(3,5-di-t-butyl-4-hydroxyphenyl)propionate, 3,9-bis[1,1-dimethyl-2-[β-(3-t-butyl-4-hydroxy-5-methylphenyl)propionyloxy]ethyl]-2,4,8,10-tetraoxaspiro[5,5]undecane and 3-(1,1-dimethylethyl)-4-hydroxy-5-methyl-2,4,8,10-tetraoxaspiro[5,5]undeca ne-3,9-diylbis(2,2-dimethyl-2,1-ethanediyl)ester of benzenepropanoic acid.

The above amine antioxidant is not specifically limited, but it is possible to use any of amine antioxidants and mixtures thereof selected among, for example, dimethyl succinate-1-(2-hydroxyethyl)-4-hydroxy-2,2,6,6-tetramethyl piperidine polycondensate, poly[{6-(1,1,3,3-tetramethylbutyl)-amino-1,3,5-triazine-2,4-diyl}{(2,2,6,6-tetr amethyl-4-piperidyl)imino}-hexamethylene-{(2,2,6,6-tetramethyl-4-piperidyl)imino}], 2-(3,5-di-t-butyl-4-hydroxybenzyl)-2-n-butyl malonate-bis(1,2,2,6,6-pentamethyl-4-piperidyl), tetrakis(,2,6,6-tetramethyl-4-piperidy)-1,2,3,4-butane tetracarboxylate, bis-2,2,6,6-tetramethyl-4-piperidyl sebacate, bis(1,2,2,6,6-pentamethyl-4-piperidyl)sebacate, methyl (1,2,2,6,6-pentamethyl-4-piperidyl)sebacate, 1-[2-[3-(3,5-di-t-butyl-4-hydrophenyl)propionyloxy]ethyl]-4-[3-(3,5-di-t-butyl-4-hydroxyphenyl)propionyloxy]-2,2,6,6-tetramethylpiperidine and 4-benzoyloxy-2,2,6,6-tetramethylpiperidine.

The above sulfur antioxidant is not specifically limited, but it is possible to use any of sulfur antioxidants and mixtures thereof selected among, for example, 4,4'-thiobis(6-t-butyl-3-methylphenol), dialkyl(C12-18)-3,3'-thiodipropionate and pentaerythritol tetrakis(3-laurylthiopropionate). More preferable is to use any of sulfur antioxidants having alkyl group having 10 or more carbon atoms and mixtures thereof selected among, for example, dialkyl(C12-18)-3,3'-thiodipropionate and pentaerythritol tetrakis(3-laurylthiopropionate).

As the combination of the carboxylic acid amide wax and the antioxidant that is to be mixed with the wax, the difference between the number of carbon atoms of the alkyl group of the higher aliphatic monocarboxylic acid of the wax and the number of carbon atoms of the at least one alkyl group of terminal structure of the antioxidant is preferably not greater than 15, is more preferably not greater than 10 and is furthermore preferably not greater than 5. When the difference in number of carbon atoms is not greater than 15, the antioxidant selectively acts on the carboxylic acid amide wax to achieve the effect of reducing the gas emission and the mold deposit derived from the carboxylic acid amide wax and the effect of improving the mechanical properties. This reason is not clear but may be attributed to that the difference in number of carbon atoms in the above range causes the carboxylic acid amide wax and the antioxidant to be readily mixed with each other and to be not easily separated from each other and is thus more likely to produce a homogeneous phase.

The amount of the antioxidant that is to be mixed with the carboxylic acid amide wax used according to an embodiment of the invention is 0.01 to 5 parts by weight relative to 100 parts by weight of the carboxylic acid amide wax. When the amount of the antioxidant mixed with the carboxylic acid amide wax is less than 0.01 parts by weight, this does not achieve the effect of reducing the gas emission and the mold deposit in the course of molding the PPS resin composition obtained by melt kneading. The amount of the antioxidant that is to be mixed with the carboxylic acid amide may be greater than 0.01 parts by weight and is more preferably not less than 0.05 parts by weight, relative to the carboxylic acid amide wax. When the amount of the antioxidant mixed with the carboxylic acid amide wax is greater than 5 parts by weight, on the other hand, the antioxidant itself provides the cause of mold deposit and accordingly does not meet the purpose of the mixing. The amount of the antioxidant that is to be mixed with the carboxylic acid amide may be less than 5 parts by weight and is more preferably not greater than 3 parts by weight, relative to 100 parts by weight of the carboxylic acid amide wax.

The carboxylic acid amide wax used according to an embodiment of the invention may be mixed and used together with the conventional higher aliphatic amide.

According to an embodiment of the invention, 0.01 to 10 parts by weight of the carboxylic acid amide wax mixture (C), which is produced by adding 0.01 to 5 parts by weight of the antioxidant to 100 parts by weight of the carboxylic acid amide wax obtained by the reaction of the higher aliphatic monocarboxylic acid, the polybasic acid and the diamine described above, is mixed with 100 parts by weight of the polyphenylene sulfide resin. When the mixing amount of the carboxylic acid amide wax mixture (C) including a specific amount of the antioxidant is less than 0.01 parts by weight, this decreases the gas emission and the mold deposit but increases the mold release resistance from the mold to cause deformation of a resulting resin molded product and thereby cause the poor mass productivity. The mixing amount of the carboxylic acid amide wax mixture (C) including the specific amount of the antioxidant may be greater than 0.01 parts by weight, is preferably not less than 0.1 parts by weight and is furthermore preferably not less than 0.2 parts by weight, relative to 100 parts by weight of the polyphenylene sulfide resin. When the mixing amount of the carboxylic acid amide wax mixture (C) including the specific amount of the antioxidant is greater than 10 parts by weight, on the other hand, this decreases the mold release resistance from the mold but reduces the mechanical strength of the resin composition. Moreover this causes the carboxylic acid amide wax mixture (C) itself including the specific amount of the antioxidant to be isolated from the PPS, adhere to the mold and eventually provide the cause of mold deposit, thus failing to achieve the effect of the invention. The mixing amount of the carboxylic acid amide wax mixture (C) including the specific amount of the antioxidant may also be less than 10 parts by weight, is preferably not greater than 8 parts by weight and is furthermore preferably not greater than 6 parts by weight, relative to 100 parts by weight of the polyphenylene sulfide resin.

(5) Inorganic Filler

Concrete examples of the inorganic filler (D) added to the resin composition according to an embodiment of the invention include fibrous fillers and non-fibrous fillers such as plate-like fillers, scale-like fillers, granular fillers, amorphous fillers and crushed fillers. More specifically, examples of the inorganic filler may include: glass fibers, milled glass fibers, flat glass fibers, modified cross section glass fibers, cut glass fibers, metal fibers (e.g., stainless steel fibers, aluminum fibers and brass fibers), organic fibers (e.g., aromatic polyamide fibers and Kevlar fibrils), gypsum fibers, ceramic fibers, asbestos fibers, zirconia fibers, alumina fibers, silica fibers, titanium oxide fibers, silicon carbide fibers, E glass (plate-like, scale-like, granular, amorphous and crushed), H glass (plate-like, scale-like, granular, amorphous and crushed), A glass (plate-like, scale-like, granular, amorphous and crushed), C glass (plate-like, scale-like, granular, amorphous and crushed), natural quartz glass (plate-like, scale-like, granular, amorphous and crushed), synthetic quartz glass (plate-like, scale-like, granular, amorphous and crushed), rock wool, alumina hydrate (whisker and plate-like), potassium titanate whiskers, barium titanate whiskers, aluminum borate whiskers, silicon nitride whiskers, talc, kaolin, silica (crushed and spherical), quartz, calcium carbonate, barium sulfate, magnesium hydroxide, zinc carbonate, mica, glass beads, glass flakes, crushed and amorphous glass, glass microballoons, clay, molybdenum disulfide, wollastonite, metal oxides such as aluminum oxide (crushed), translucent alumina (fibrous, plate-like, scale-like, granular, amorphous and crushed), titanium oxide (crushed) and zinc oxide (fibrous, plate-like, scale-like, granular, amorphous and crushed), metal hydroxides such as aluminum hydroxide (fibrous, plate-like, scale-like, granular, amorphous and crushed), aluminum nitride, translucent aluminum nitride (fibrous, plate-like, scale-like, granular, amorphous and crushed), calcium polyphosphate, graphite, metal powder, metal flakes and metal ribbons. Specific examples of the metal species of the metal powder, the metal flakes and the metal ribbons may be silver, nickel, copper, zinc, aluminum, stainless steel, iron, brass, chromium and tin. The inorganic filler may also be carbon filler, such as carbon powder, graphite, carbon flakes, scale-like carbon, carbon nanotubes, and PAN series and pitch series of carbon fibers. Two or more of these fillers may be used in combination. Among them, glass fibers, glass beads, glass flakes and calcium carbonate are more preferable.

The above glass fiber or the other filler used according to an embodiment of the invention may have the surface pretreated with a known coupling agent (for example, an isocyanate compound, an organosilane compound, an organotitanate compound, an organoborane compound or an epoxy compound).

The mixing amount of the inorganic filler (D) used for the resin composition according to an embodiment of the invention is preferably 1 to 400 parts by weight relative to 100 parts by weight of the PPS resin (A) by considering the good balance between the heat resistance and the mechanical properties. Mixing the inorganic filler (D) in this range produces a composition having the improved heat resistance and the improved mechanical properties. The mixing amount of the inorganic filler (D) may be greater than 1 parts by weight, is preferably not less than 5 parts by weight and is more preferably not less than 10 parts by weight relative to 100 parts by weight of the PPS resin (A). The mixing amount of the inorganic filler (D) may also be less than 400 parts by weight, is preferably not greater than 200 parts by weight and is more preferably not greater than 150 parts by weight relative to 100 parts by weight of the PPS resin (A).

(6) Other Additive Components

Additionally, for the purpose of improving, for example, the mechanical strength and the toughness, a silane compound having at least one functional group selected among epoxy group, amino group, isocyanate group, hydroxyl group, mercapto group and ureido group may be added to the PPS resin composition according to an embodiment of the invention in a range that does not degrade the effect of the embodiment of the invention. Specific examples of this compound include: epoxy group-containing alkoxysilane compounds such as γ-glycidoxypropyltrimethoxysilane, γ-glycidoxypropyltriethoxysilane and β-(3,4-epoxycyclohexyl)ethyltrimethoxysilane; mercapto group-containing alkoxysilane compounds such as γ-mercaptopropyltrimethoxysilane and γ-mercaptopropyltriethoxysilane; ureido group-containing alkoxysilane compounds such as γ-ureidopropyltriethoxysilane, γ-ureidopropyltrimethoxysilane and γ-(2-ureidoethyl)aminopropyltrimethoxysilane; isocyanate group-containing alkoxysilane compounds such as γ-isocyanatopropyltriethoxysilane, γ-isocyanatopropyltrimethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane and γ-isocyanatopropyltrichlorosilane; amino group-containing alkoxysilane compounds such as γ-(2-aminoethyl)aminopropylmethyldimethoxysilane, γ-(2-aminoethyl)aminopropyltrimethoxysilane and γ-aminopropyltrimethoxysilane; and hydroxyl group-containing alkoxysilane compounds such as γ-hydroxypropyltrimethoxysilane and γ-hydroxypropyltriethoxysilane. Among them, the alkoxysilanes having epoxy group, amino group, isocyanate group and hydroxyl group are especially preferable to achieve the excellent weld strength.

As the preferable added amount of this silane compound, the range of 0.05 to 3 parts by weight is selected relative to 100 parts by weight of the PPS resin.

Another resin may additionally be used to be blended with the PPS resin composition according to an embodiment of the invention in a range that does not degrade the effects of the embodiment of the invention. This blendable resin is not specifically limited, but concrete examples include: polyamides such as nylon 6, nylon 66, nylon 610, nylon 11, nylon 12 and aromatic nylons; and polyester resins such as polyethylene terephthalate, polybutylene terephthalate, polycyclohexyl dimethylene terephthalate and polynaphthalene terephthalate. Additional examples include: polyethylene, polypropylene, polytetrafluoroethylene, polyamide imide, polyacetal, polyimide, polyether imide, polyethersulfone, modified polyphenylene ether resin, polysulfone resin, polyarylsulfone resin, polyketone resin, polyarylate resin, liquid crystal polymer, polyether ketone resin, poly(thioether ketone) resin, polyether ether ketone resin, polyamide imide resin, polyethylene tetrafluoride resin and acrylonitrile-styrene resin.

A conventional additive may further be added to the PPS resin composition according to an embodiment of the invention in a range that does not degrade the effects of the embodiment of the invention. Examples of the available additive include weather resistant agents (e.g., resorcinol, salicylate, benzotriazole, benzophenone and hindered amine), pigments (e.g., cadmium sulfide, phthalocyanine and carbon black for coloring), dyes (e.g., nigrosine), crystal nucleating agents (e.g., talc, silica, kaolin and clay), plasticizers (e.g., octyl p-oxybenzoate and N-butylbenzene sulfonamide), antistatic agents (e.g., alkyl sulfate-type anionic antistatic agents, quaternary ammonium salt-type cationic antistatic agents, nonionic antistatic agents like polyoxyethylene sorbitan monostearate and betaine-type amphoteric antistatic agents), flame retardants (e.g., red phosphorus, phosphate ester, melamine cyanurate, hydroxides like magnesium hydroxide and aluminum hydroxide, ammonium polyphosphate, brominated polystyrene, brominated polyphenylene ether, brominated polycarbonate, brominated epoxy resin and combinations of these brominated flame retardants and antimony trioxide), heat stabilizers, lubricants (e.g., calcium stearate, aluminum stearate and lithium stearate), ultraviolet rays protective agents, coloring agents and foaming agents.

(7) Manufacturing Method of PPS Resin Composition

The manufacturing method of the PPS resin composition according to an embodiment of the invention is not specifically limited. For example, an applicable method may supply the respective raw materials to a generally known melt mixing machine such as a single-screw extruder, a twin-screw extruder, a Banbury mixer, a kneader, or a mixing roll and knead the supplied raw materials at the temperature of 280 to 380° C. The mixing order of the raw materials is also not specifically limited. Any of various methods may be employed: for example, a method of mixing all the raw materials and subsequently melt-kneading the mixture by the method described above; a method of mixing part of the raw materials, subsequently melt-kneading the mixture by the method described above, further adding the remaining raw materials and further melt-kneading the mixture; and a method of mixing the remaining raw materials by using a side feeder while melt-kneading part of the raw materials mixed in advance by a single-screw extruder or a twin-screw extruder. With respect to a small amount of an additive component, an applicable method may melt-knead and form the other components to pellets, for example, by the method described above, subsequently add the additive component to the pellets before molding and mold the mixture.

The production method of the PPS resin composition according to an embodiment of the invention manufactured by the generally known method is described more specifically. The PPS resin composition according to an embodiment of the invention may be manufactured by, for example, supplying the PPS resin (A), the olefin elastomer (B), the carboxylic acid amide wax mixture including the antioxidant (C) and the inorganic filler (D) and the other additives as other optional additive components to, for example, an extruder with or without preliminary mixing and sufficiently melt-kneading the mixture. When the inorganic filler (D) contains a fibrous filler including glass fibers, in order to prevent breakage of the fibrous filler, a preferable method supplies the PPS resin (A), the olefin elastomer (B), the carboxylic acid amide wax mixture including the antioxidant (C), the non-fibrous filler of the inorganic filler (D) and the other additives from the main feeder, while supplying the fibrous filler of the inorganic filler (D) from the side feeder to the extruder, so as to manufacture the PPS resin composition.

In order to prevent the thermal degradation of the olefin elastomer (B), another preferable method is to supply the entire amount of or part of the olefin elastomer (B) from the side feeder to the extruder.

In manufacturing the PPS resin composition according to an embodiment of the invention, the composition may be melt kneaded at 260 to 360° C. by using, for example, a single-screw extruder, a twin-screw structure or a tri-screw extruder with an "Uni-Melt (registered trademark)"-type screw or a kneader-type mixer.

(8) Applications of PPS Resin Composition

The PPS resin composition of the embodiment of the invention obtained as described above has excellent toughness, little gas emission, and excellent mold releasability. This PPS resin composition accordingly allows for various molding techniques, such as injection molding, extrusion molding, blow molding and transfer molding, and is especially suitable for applications of injection molding. Above all, this PPS resin composition is especially preferable for applications of injection molding to produce a molded product having a hollow part. An example of the molded product having a hollow part may be components configured to allow passage of a fluid into the molded product, for example, for plumbing application. These molded products need the surface smoothness and the high dimensional accuracy, in order to prevent leakage of the internal fluid. The increase in mold deposit, however, increases the surface roughness, which may cause leakage. The poor mold releasability from the mold causes deformation in the course of mold release, which may cause out-of-dimensions and result in failing to manufacture good-quality products. The PPS resin composition according to the embodiment of the invention is thereby suitable for these applications.

Other possible applications of the PPS resin composition according to the embodiment of the invention include: for example, electric and electronic components, such as sensors, LED lamps, connectors, sockets, resistors, relay cases, switches, coil bobbins, capacitors, variable capacitor cases, oscillators, various terminal strips and boards, transformers, plugs, printed circuit boards, tuners, speakers, microphones, headphones, small motors, magnetic head bases, semiconductors, liquid crystal, FDD carriages, FDD chassis, motor brush holders, parabola antennas, and computer components; and domestic and office electric appliance components, such as VTR components, TV set components, irons, hair dryers, rice cooker components, microwave oven components, acoustic components, audio equipment components for audios, laser disks and compact disks, lighting components, refrigerator components, air conditioner components; typewriter components and word processor components. Possible applications also include: office computer components; telephone components; facsimile components; copy machine components; cleaning jigs; motor components; machine components for lighters and typewriters; optical equipment and precision machine components, such as microscopes, binoculars, cameras and watches; plumbing components, such as packings for faucets, combination faucets, mixing valves, pump components, pipe joints, various joints (e.g., elbow joints, T joints and socket joints), water flow control valves, reducing valves, relief valves, solenoid valves, three-way valves, thermo valves, water temperature sensors, water flow sensors, adapters for bathtubs and water meter housings. Possible applications further include automobile and vehicle components, such as valve alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for air conditioners, hot air flow control valves, brush holders for radiator motors, water pump impellers, turbine vanes, wiper motor components, distributors, starter switches, starter relays, transmission wire harnesses, windshield washer fluid nozzles, air conditioner panel switch plates, fuel solenoid valve coils, fuse connectors, horn terminals, electric component insulators, step motor rotors, lamp sockets, lamp reflectors, lamp housings, brake pistons, solenoid bobbins, engine oil filters, ignition cases, vehicle speed sensors and cable liners.

EXAMPLES

The invention is described more specifically with reference to examples. These examples are, however, only illustrative and not restrictive in any sense.

The MFR of PPS resins (A1) and (A2) produced by the following methods was measured in conformity with JIS K7210.

Reference Example 1

Polymerization of PPS Resin (A1)

The method placed 8.27 kg (70.00 mol) of 47.5% sodium hydrosulfide, 2.94 kg (70.63 mol) of sodium hydroxide 96%, 11.45 kg (115.50 mol) of N-methyl-2-pyrrolidone (NMP), 0.513 kg (6.25 mol) of sodium acetate and 3.82 kg of ion exchange water in a 70-liter autoclave with a stirrer and a bottom stop valve and gradually heated the mixture to 245° C. in about 3 hours at ordinary pressure with the nitrogen flow. After distillation of 8.09 kg of water and 0.28 kg of NMP, the reaction vessel was cooled down to 200° C. The remaining amount of water in the system per 1 mol of the fed alkali metal sulfide was 1.06 mol including water consumed for hydrolysis of NMP, and the release amount of hydrogen sulfide was 0.02 mol per 1 mol of the fed alkali metal sulfide. After cooling down to 200° C., the method added 10.34 kg (70.32 mol) of p-dichlorobenzene and 9.37 kg (94.50 mol) of NMP, sealed the reaction vessel under nitrogen gas, raised the temperature from 200° C. to 270° C. at a rate of 0.6° C./minute with stirring at 240 rpm, and continued the reaction at 270° C. for 140 minutes. The method then cooled down the reaction vessel from 270° C. to 250° C. in 15 minutes, while pressing 2.67 kg (148.4 mol) of water into the reaction vessel. The reaction vessel was subsequently cooled down gradually from 250° C. to 220° C. in 75 minutes and was then rapidly cooled down to about room temperature, and the content was taken out of the reaction vessel. The method diluted the content with about 35 liters of NMP to slurry, stirred the slurry at 85° C. for 30 minutes and obtained the solid substance by subsequent filtration with a 80 mesh screen (aperture: 0.175 mm). The obtained solid substance was similarly washed with about 35 liters of NMP and was subjected to filtration. The operation of diluting the obtained solid substance with 70 liters of ion exchange water, stirring the mixture at 70° C. for 30 minutes and subsequently recovering the solid substance by filtration with the 80 mesh screen was repeated a total of three times. The method diluted the resulting solid substance and 32 g of acetic acid with 70 liters of ion exchange water, stirred the mixture at 70° C. for 30 minutes, filtered the mixture with the 80 mesh screen, further diluted the resulting solid substance with 70 liters of ion exchange water, stirred the mixture at 70° C. for 30 minutes and then recovered the solid substance by filtration with the 80 mesh screen. The solid substance obtained by the above method was dried at 120° C. under nitrogen flow to yield dried PPS. The resulting PPS had the MFR of 600 g/10 minutes and the melt viscosity of 100 Pa·s (320° C., shear rate of 1000/s).

Reference Example 2

Polymerization of PPS Resin (A2)

The method placed 8.27 kg (70.00 mol) of 47.5% sodium hydrosulfide, 2.96 kg (70.97 mol) of sodium hydroxide 96%, 11.45 kg (115.50 mol) of N-methyl-2-pyrrolidone (NMP), 2.58 kg (31.50 mol) of sodium acetate and 10.5 kg of ion exchange water in a 70-liter autoclave with a stirrer and gradually heated the mixture to 245° C. in about 3 hours at ordinary pressure with the nitrogen flow. After distillation of 14.78 kg of water and 0.28 kg of NMP, the reaction vessel was cooled down to 160° C. The remaining amount of water in the system per 1 mol of the fed alkali metal sulfide was 1.06 mol including water consumed for hydrolysis of NMP, and the release amount of hydrogen sulfide was 0.02 mol per 1 mol of the fed alkali metal sulfide. The method then added 10.24 kg (69.63 mol) of p-dichlorobenzene and 9.01 kg (91.00 mol) of NMP, sealed the reaction vessel under nitrogen gas and raised the temperature to 238° C. at a rate of 0.6° C./minute with stirring at 240 rpm. After the reaction at 238° C. for 95 minutes, the method further raised the temperature to 270° C. at a rate of 0.8° C./minute. After the reaction at 270° C. for 100 minutes, the method cooled down the reaction vessel to 250° C. at a rate of 1.3° C./minute, while pressing 1.26 kg (70 mol) of water into the reaction vessel in 15 minutes. The reaction vessel was subsequently cooled down to 200° C. at a rate of 1.0° C./minute and was then rapidly cooled down to about room temperature. The content was taken out and was diluted with 26.3 kg of NMP. After that, the solid substance was separated from the solvent by a sieve (80 mesh), and the resulting particles were washed with 31.9 kg of NMP and were filtrated. These particles were subsequently washed with 56.0 kg of ion exchange water several times and were filtrated. The particles were then washed with 70.0 kg of a 0.05% by weight aqueous acetic acid solution and were filtrated. The particles were further washed with 70.0 kg of ion exchange water and were filtrated. The obtained water-containing PPS particles were dried with hot air at 80° C. and were subsequently dried under reduced pressure at 120° C. The resulting PPS had the MFR of 100 g/10 minutes and the melt viscosity of 180 Pa·s (320° C., shear rate of 1000/s).

Reference Example 3

Synthesis of Carboxylic Acid Amide Wax (C1)

After 1.97 mol of stearic acid and 0.32 mol of sebacic acid were placed in a reactor and were dissolved by heating, 1.37 mol of ethylene diamine was added little by little. The dehydration reaction started from 160° C. in nitrogen flow. After the reaction until reduction of the amine value to or below 5 at 250° C., wax was produced (C1 with alkyl group having the number of carbon atoms=17). This wax as a sample was subjected to differential scanning calorimetry under the conditions that the rate of temperature rise and the rate of temperature decrease were both 20° C./minute, the scanning range was 50 to 170° C. and the amount of the sample was about 4 mg. The sample was scanned continually twice, and the value of a second melting peak was measured. An endothermic peak was observed at 143° C., and its heat quantity was 79 J/g. Ethylene bis-stearyl amide (corresponding to the reaction product that is the reactant of the higher aliphatic monocarboxylic acid and the diamine in the case of using the above raw materials and that does not include a polybasic acid) as a sample was, on the other hand, similarly subjected to differential scanning calorimetry. An endothermic peak was observed at 145° C., and its heat quantity was 125 J/g. Since these two endothermic peaks substantially matched with each other, the endothermic peak of the wax C1 at 143° C. was thus assumed to correspond to a peak of ethylene bis-stearyl amide. From the ratio of heat quantity, the amount of ethylene bis-stearyl amide contained in the wax C1 was determined to be about 63% by weight.

Reference Example 4

Synthesis of Carboxylic Acid Amide Wax (C2)

After 2 mol of stearic acid and 1 mol of sebacic acid were placed in a reactor and were dissolved by heating, 2 mol of ethylene diamine was added. The dehydration reaction started from 160° C. in nitrogen flow. After the reaction until reduction of the amine value to or below 5 at 250 to 260° C., wax was produced (C2, alkyl group having the number of carbon atoms=17). The obtained wax was subjected to differential scanning calorimetry by the same method as described above. An endothermic peak was observed at 143° C., and its heat quantity was 37.5 J/g. From the ratio of heat quantity, the amount of ethylene bis-stearyl amide contained in the wax C2 was determined to be about 30% by weight.

Reference Example 5

Synthesis of Carboxylic Acid Amide Wax Mixture (C3) Including Antioxidant

The wax (C1), carboxylic acid amide wax, was produced by the same method as Reference Example 3. A carboxylic acid amide wax mixture (C3) was produced by adding 3 parts by weight of 3,9-bis[2,6-bis(1,1-dimethylethyl)-4-methylphenoxy]-2,4,8,10-tetraoxa-3,9-di phosphaspiro[5,5]undecane (ADK STAB PEP36 with alkyl group having the number of carbon atoms=4, manufactured by ADEKA CORPORATION) as the antioxidant to 100 parts by weight of the wax (C1) and subsequently cooling down.

Reference Example 6

Synthesis of Carboxylic Acid Amide Wax Mixture (C4) Including Antioxidant

The wax (C2), carboxylic acid amide wax, was produced by the same method as Reference Example 4. A carboxylic acid amide wax mixture (C4) was produced by adding 3 parts by weight of 3-(1,1-dimethylethyl)-4-hydroxy-5-methyl-2,4,8,10-tetraoxaspiro[5,5]undeca ne-3,9-diylbis(2,2-dimethyl-2,1-ethanediyl)ester of benzenepropanoic acid (ADK STAB AO-80 with alkyl group having the number of carbon atoms=4, manufactured by ADEKA CORPORATION) as the antioxidant to 100 parts by weight of the wax (C2) and subsequently cooling down.

Reference Example 7

Synthesis of Carboxylic Acid Amide Wax Mixture (C5) Including Antioxidant

The wax (C1), carboxylic acid amide wax, was produced by the same method as Reference Example 3. A carboxylic acid amide wax mixture (C5) was produced by adding 3 parts by weight of distearyl pentaerythritol diphosphite (ADK STAB PEP8 with alkyl group having the number of carbon atoms=18, manufactured by ADEKA CORPORATION) as the antioxidant to 100 parts by weight of the wax (C1) and subsequently cooling down.

Reference Example 8

Synthesis of Carboxylic Acid Amide Wax Mixture (C4) Including Antioxidant

The wax (C2), carboxylic acid amide wax, was produced by the same method as Reference Example 4. A carboxylic acid amide wax mixture (C6) was produced by adding 0.5 parts by weight of distearyl pentaerythritol diphosphite (PEP8) as the antioxidant to 100 parts by weight of the wax (C2) and subsequently cooling down.

[Component Materials Used in Examples and Comparative Examples and Production Method of PPS Resin Composition]

Polyphenylene sulfide resin compositions of Examples 1 to 8 and Comparative Examples 1 to 6 were produced by the methods described below. The component materials and their mixing amounts used for producing the polyphenylene sulfide resin compositions of the respective Examples and Comparative Examples are shown in Tables 1 to 3 described later.

Examples 1 to 8

A twin-screw extruder (TEX-44 manufactured by the Japan Steel Works, LTD.) having a middle feed port of 44 mm in diameter at the cylinder temperature set to 310° C. and the screw rotation speed of 200 rpm was used for manufacturing the PPS resin composition. The PPS resin (A), the ethylene-α-olefin elastomer and optionally the functional group-containing olefin elastomer (B) and the carboxylic acid amide wax mixture (C) were supplied at the weight ratio shown in Table 1 from a material supply port and were in the molten state. The inorganic filler (D) was additionally supplied at the weight ratio shown in Table 1 from the middle feed port, and pellets were obtained by melt-kneading the mixture at the ejection rate of 40 kg/hour.

Comparative Examples 1, 3 and 4

In the twin-screw extruder used in Examples, the PPS resin (A), the ethylene-α-olefin elastomer (B), the carboxylic acid amide wax and the antioxidant as another additive were supplied at the weight ratio shown in Table 2 from the material supply port and were in the molten state. With respect to Comparative Examples 3 and 4, the inorganic filler (D) was additionally supplied at the weight ratio shown in Table 2 from the middle feed port, and pellets were obtained by melt-kneading the mixture at the ejection rate of 40 kg/hour.

Comparative Example 2

In the twin-screw extruder used in Examples, the PPS resin (A), the ethylene-α-olefin elastomer (B) and the carboxylic acid amide wax were supplied at the weight ratio shown in Table 2 from the material supply port and were in the molten state. The inorganic filler (D) was additionally supplied at the weight ratio shown in Table 2 from the middle feed port, and pellets were obtained by melt-kneading the mixture at the ejection rate of 40 kg/hour.

Comparative Examples 5 and 6

In the twin-screw extruder used in Examples, 100 parts by weight of the PPS resin (A) and the carboxylic acid amide wax mixture (C) were supplied at the weight ratio shown in Table 2 from the material supply port and were in the molten state. With respect to Comparative Example 6, the inorganic filler (D) was additionally supplied at the weight ratio shown in Table 2 from the middle feed port, and pellets were obtained by melt-kneading the mixture at the ejection rate of 40 kg/hour.

The following PPS resins (A) were used in these Examples and Comparative Examples:

A1: PPS resin polymerized by the method described in Reference Example 1; and

A2: PPS resin polymerized by the method described in Reference Example 2.

The following olefin elastomers (B) were used in Examples and Comparative Examples:

B1: Ethylene-1-octene block copolymer (manufactured by the Dow Chemical Company, INFUSE 9807, density: 866 kg/m3, melting point: 118° C., glass transition temperature: −62° C.);

B2: Ethylene-1-butene random copolymer (manufactured by Mitsui Chemicals, Inc., TAFMER TX650, density: 864 kg/m3, no melting point, glass transition temperature: −64° C.); and B3: Ethylene-glycidyl methacrylate copolymer (manufactured by Sumitomo Chemical Company, Ltd., Bondfast E, copolymerization ratio of glycidyl methacrylate=12% by weight, density: 940 kg/m3, melting point: 103° C., glass transition temperature: −26° C.).

The following carboxylic acid amide waxes and the carboxylic acid amide wax mixtures (C) were used in Examples and Comparative Examples:

C1: Carboxylic acid amide wax manufactured by the method described in Reference Example 3;

C2: Carboxylic acid amide wax manufactured by the method described in Reference Example 4;

C3: Carboxylic acid amide wax mixture including the antioxidant that was manufactured by the method described in Reference Example 5;

C4: Carboxylic acid amide wax mixture including the antioxidant that was manufactured by the method described in Reference Example 6;

C5: Carboxylic acid amide wax mixture including the antioxidant that was manufactured by the method described in Reference Example 7; and C6: Carboxylic acid amide wax mixture including the antioxidant that was manufactured by the method described in Reference Example 8.

The following inorganic filler (D) and the other additives were used in Examples and Comparative Examples:

D1: Chopped strand (manufactured by Nippon Electric Glass Co., Ltd., T-747H, 3 mm long, average fiber diameter: 10.5 μm);

E1: 3,9-bis[2,6-bis(1,1-dimethylethyl)-4-methylphenoxy]-2,4,8,10-tetraoxa-3,9-diphosphaspiro[5,5]undecane (manufactured by ADEKA CORPORATION, ADK STAB PEP36). Identical with the antioxidant added to the carboxylic acid amide wax mixture C3; and E2: 3-(1,1-dimethylethyl)-4-hydroxy-5-methyl-2,4,8,10-tetraoxaspiro[5,5]undecane-3,9-diylbis(2,2-dimethyl-2,1-ethanediyl)ester of benzenepropanoic acid (manufactured by ADEKA CORPORATION, ADK STAB AO-80). Identical with the antioxidant added to the carboxylic acid amide wax mixture C4.

[Measurement Method]

By using the pellets of the respective Examples and Comparative Examples described above, the physical properties were measured and tested by the following methods, and the characteristics of the respective Examples and Comparative Examples were evaluated.

(1) Tensile Properties:

The tensile strength and the tensile fracture elongation were measured respectively in conformity to ISO 527-1 and ISO 527-2. The tensile strength indicates the mechanical strength, and the tensile fracture elongation indicates the toughness. The tensile yield strength was provided as the tensile strength with respect to Example 1 and Comparative Example 1, neither of which included the inorganic filler (D), while the tensile fracture strength was provided as the tensile strength with respect to the respective Examples and Comparative Examples other than the above, each of which included the inorganic filler (D).

(2) Mold Deposit and Appearance:

A thin plate-like molded product was produced by injection molding from each of the PPS resin compositions of the respective Examples and Comparative Examples, and the mold deposit and the mold appearance were evaluated after molding. Specifically, continuous molding was performed by using an injection molding machine SE-30D manufactured by Sumitomo Heavy Industries, Ltd. with a mold for evaluation having the maximum length of 55 mm, the width of 20 mm and the thickness of 2 mm as the size of the molded product, the width of 2 mm and the thickness of 1 mm (side gate) as the gate size and the maximum length of 20 mm, the width of 10 mm and the depth of 5 μm as the size of the gas vent. More specifically, the conditions of the continuous molding were: cylinder temperature of 305° C., mold temperature of 130° C., injection speed of 100 mm/s, injection pressure set in 50 to 80 MPa to achieve the filling time of 0.4 second with respect to each resin composition, holding pressure of 25 MPa, pressure-holding speed of 30 mm/s and pressure-holding time of 3 seconds. The mold appearance was evaluated as "excellent" (double circle) when no deposit was observed in the gas vent or in the cavity on completion of 200 shots and "poor" (cross mark) when any deposit was observed. The deposit accumulated on the gas vent and the cavity on completion of the above molding was collected with a knife for micro-sampling, while being checked with an optical microscope. The collected deposit was placed in a tin boat for elemental analysis manufactured by LUDI SWISS AG and subjected to previous weight measurement. The mass was measured as the amount of mold deposit by using a microbalance XP2U manufactured by Mettler Toledo International Inc. Besides, the outline shape of the molded product of the used mold for evaluation is shown in FIG. 1.

(3) Mold Releasability

Figure 2:
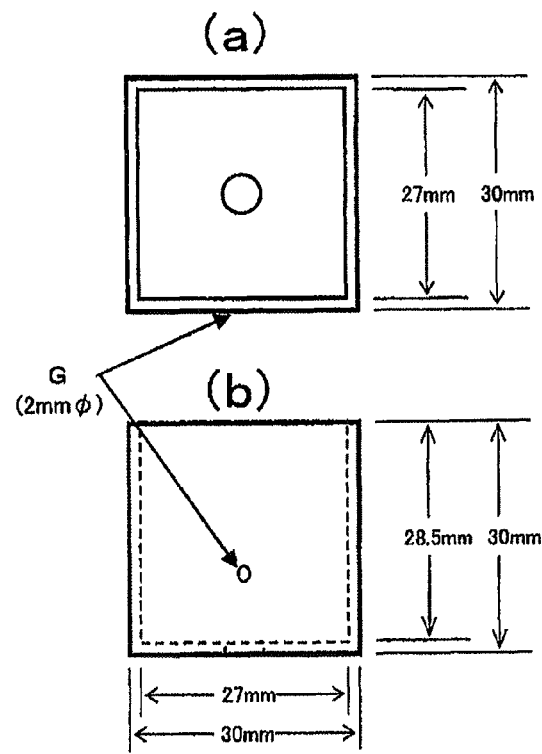
FIG. 2(a) is a schematic plan view and FIG. 2(b) is a schematic side view of a molded product for measurement of the mold release force molded in Examples.

The resisting force during mold release (mold release force) was measured as the indication of the mold releasability. A concrete measurement method of the mold release force measured and compared the mold release force by using SE-30D manufactured by Sumitomo Heavy Industries, Ltd. with a mold for a molded product having the shape illustrated in FIG. 2 under the conditions of the cylinder temperature of 320° C. and the mold temperature of 130° C. FIG. 2(a) is a top view of the molded product, and FIG. 2(b) is a side view of the molded product. As illustrated in FIG. 2, the molded product had the hollow cubic shape with the open top face. For measurement of the mold release force, "Load Cell 1C-1B" manufactured by Technoplas Inc. was inserted in the mold. The mold release force was then measured in the course of protruding the bottom face of the molded product of FIG. 2 with four ejector pins of 10 φ, by using "MD-1031" manufactured by Toyo Baldwin Co., Ltd. for a strain amplifier and "Memory Hicorder 8840" manufactured by HIOKI E.E. Corporation for a recorder. The ejection time was 10 seconds, and the cooling time was also 10 seconds. The smaller numerical value of the mold release force indicates the more excellent mold releasability.

With respect to the respective Examples and Comparative Examples, the results of evaluation by the above measurements are collectively shown along with the component materials used and their mixing amounts in Tables 1 to 3.

TABLE 1

| | | | EX 1 | EX 2 | EX 3 | EX 4 | EX 5 | EX 6 | EX 7 | EX 8 |
|---|---|---|---|---|---|---|---|---|---|---|
| (A)PPS resin | Type | | A1 | A1 | A1 | A2 | A1 | A1 | A2 | A1 |
| | Mixing amount | Parts by weight | 100 | 100 | 100 | 100 | 100 | 100 | 100 | 100 |
| (B)Ethylene- α-olefin elastomer | Type | | B1 | B1 | B2 | B1 | B1 | B1 | B2 | B1 |
| | Mixing amount | Parts by weight | 33 | 10 | 10 | 5 | 10 | 5 | 10 | 10 |
| (B)Functional group-containing olefin elastomer | Type | | — | — | — | B3 | — | B3 | — | — |
| | Mixing amount | Parts by weight | 0 | 0 | 0 | 5 | 0 | 5 | 0 | 0 |
| (C)Mixture | Type | | C3 | C3 | C4 | C3 | C3 | C5 | C5 | C6 |
| | Mixing amount | Parts by weight | 1.6 | 0.80 | 0.80 | 0.80 | 0.80 | 0.80 | 5 | 0.80 |
| Amount of antioxidant contained in mixture (C)*[1] | Parts by weight | | 3 | 3 | 3 | 3 | 3 | 3 | 3 | 0.5 |
| (D)Inorganic filler | Type | | — | D1 | D1 | D1 | D1 | D1 | D1 | D1 |
| | Mixing amount | Parts by weight | 0 | 50 | 50 | 50 | 100 | 50 | 50 | 50 |
| Other additives | Type | | — | — | — | — | — | — | — | — |
| | Mixing amount | Parts by weight | 0 | 0 | 0 | 0 | 0 | 0 | 0 | 0 |
| Ratio of antioxidant in PPS resin composition | $\times 10^{-2}$% | | 3.6 | 1.5 | 1.5 | 1.5 | 1.1 | 1.5 | 9.0 | 0.25 |
| Difference in number of carbon atoms between carboxylic acid amide wax and antioxidant | | | 13 | 13 | 13 | 13 | 13 | 1 | 1 | 1 |
| Tensile strength | MPa | | 50 | 146 | 144 | 151 | 143 | 152 | 143 | 146 |
| Tensile fracture elongation | % | | 32.0 | 3.2 | 3.1 | 3.1 | 3.0 | 3.1 | 3.0 | 3.2 |
| Mold deposit | μg | | 18.5 | 13.0 | 11.7 | 9.8 | 10.9 | 8.7 | 18.1 | 11.3 |
| Mold appearance | Appearance | | ◎ | ◎ | ◎ | ◎ | ◎ | ◎ | ◎ | ◎ |
| Mold release force | N | | 80 | 123 | 115 | 100 | 138 | 102 | 98 | 111 |

*[1]Amount of the antioxidant relative to 100 parts by weight of the carboxylic acid amide wax in the mixture (C)
(C)Mixture: carboxylic acid amide wax mixture

TABLE 2

| | | | COMP EX 1 | COMP EX 2 | COMP EX 3 | COMP EX 4 |
|---|---|---|---|---|---|---|
| (A)PPS resin | Type | | A2 | A1 | A2 | A1 |
| | Mixing amount | Parts by weight | 100 | 100 | 100 | 100 |
| (B)Ethylene- α-olefin elastomer | Type | | B1 | B1 | B1 | B2 |
| | Mixing amount | Parts by weight | 33 | 10 | 10 | 10 |
| (B)Functional group-containing olefin elastomer | Type | | — | — | — | — |
| | Mixing amount | Parts by weight | 0 | 0 | 0 | 0 |
| Carboxylic acid amide wax | Type | | C1 | C1 | C2 | C1 |
| | Mixing amount | Parts by weight | 1.6 | 0.80 | 1.6 | 0.80 |
| Amount of antioxidant contained in mixture (C)*[1] | Parts by weight | | 0 | 0 | 0 | 0 |
| (D) Inorganic filler | Type | | — | D1 | D1 | D1 |
| | Mixing amount | Parts by weight | 0 | 50 | 50 | 100 |

TABLE 2-continued

|  |  | COMP EX 1 | COMP EX 2 | COMP EX 3 | COMP EX 4 |
|---|---|---|---|---|---|
| Other additives | Type | E1 | — | E2 | E2 |
|  | Mixing amount Parts by weight | 0.05 | 0 | 0.024 | 0.023 |
| Ratio of antioxidant in PPS resin composition | $\times 10^{-2}$% | 3.7 | 0 | 1.5 | 1.1 |
| Difference in number of carbon atoms between carboxylic acid amide wax and antioxidant |  | 13 | — | 13 | 13 |
| Tensile strength | MPa | 47 | 144 | 142 | 141 |
| Tensile fracture elongation | % | 28.0 | 2.9 | 3.0 | 2.7 |
| Mold deposit | μg | 23.4 | 21.9 | 20.1 | 22.2 |
| Mold appearance | Appearance | X | X | X | X |
| Mold release force | N | 185 | 176 | 130 | 223 |

*[1]Comparative Examples 1 to 4 do not include the mixture (C)
(C) Mixture: carboxylic acid amide wax mixture

TABLE 3

|  |  | COMP EX 5 | COMP EX 6 |
|---|---|---|---|
| (A)PPS resin | Type | A1 | A1 |
|  | Mixing amount Parts by weight | 100 | 100 |
| (B)Ethylene-α-olefin elastomer | Type | — | — |
|  | Mixing amount Parts by weight | 0 | 0 |
| (B)Functional group-containing olefin elastomer | Type | — | — |
|  | Mixing amount Parts by weight | 0 | 0 |
| (C)Mixture | Type | C3 | C5 |
|  | Mixing amount Parts by weight | 1.6 | 0.80 |
| Amount of antioxidant contained in mixture (C)*[1] | Parts by weight | 3 | 3 |
| (D)Inorganic filler | Type | — | D1 |
|  | Mixing amount Parts by weight | 0 | 50 |
| Other additives | Type | — | — |
|  | Mixing amount Parts by weight | 0 | 0 |
| Ratio of antioxidant in PPS resin composition | $\times 10^{-2}$% | 4.7 | 1.6 |
| Difference in number of carbon atoms between carboxylic acid amide wax and antioxidant |  | 13 | 13 |
| Tensile strength | MPa | 80 | 180 |
| Tensile fracture elongation | % | 1.8 | 1.9 |
| Mold deposit | μg | 10.4 | 10.3 |
| Mold appearance | Appearance | ◎ | ◎ |
| Mold release force | N | 119 | 120 |

*[1]Amount of the antioxidant relative to 100 parts by weight of the carboxylic acid amide wax in the mixture (C)
(C) Mixture: carboxylic acid amide wax mixture The results of evaluation with respect to Examples 1 to 8 in Table 1 and Comparative Examples 1 to 4 in Table 2 show that the PPS resin composition having the excellent toughness is produced by mixing the PPS resin (A) with the olefin elastomer (B). Additionally, the following is indicated by the comparison between the results of evaluation with respect to Examples 1 to 8, in which the antioxidant was mixed in advance with the carboxylic acid amide wax, and the results of evaluation with respect to Comparative Examples 1, 3 and 4, in which the antioxidant was added separately from the carboxylic acid amide wax in the course of melt kneading. Specifically, it is shown that addition of the carboxylic acid amide wax mixture (C) including the antioxidant mixed in advance reduces the mold deposit and improves the mold releasability of the PPS resin composition.

Both the olefin elastomer (B) and the carboxylic acid amide wax added to the PPS resin composition are expected to provide the cause of mold deposit. According to the comparison between the results of evaluation of Comparative Examples 1 to 4 and the results of evaluation of Examples 1 to 8, it is shown that the mold deposit is reduced by previously mixing the antioxidant with the carboxylic acid amide wax. From this, it is estimated that the mold deposit derived from the carboxylic acid amide wax is selectively and efficiently reduced by previously mixing the antioxidant with the carboxylic acid amide wax. In other words, producing the PPS resin composition by mixing the carboxylic acid amide wax mixture (C) that includes the previously added antioxidant, as well as the olefin elastomer (B) with the PPS resin (A) enables all the improvement in toughness, the improvement in mold releasability and the reduction in mold deposit with respect to the PPS resin composition.

As understood from the comparison between Example 1 and Examples 2 to 8, further addition of the inorganic filler improves the strength of the PPS resin composition, in addition to obtaining the above properties of the embodiment.

As shown in the results of evaluation of Comparative Examples 5 and 6 in Table 3, the sufficient toughness is not achievable by mixing only the carboxylic acid amide wax mixture (C) including the previously added antioxidant with the PPS resin (A) without mixing the olefin elastomer (B). In Comparative Examples 5 and 6, however, the problem of mold deposit does not arise, since the PPS resin composition does not include the olefin elastomer (B), which is expected to provide the cause of mold deposit.

The molded product produced as described above maintains the chemical resistance and the hot water resistance, which the PPS resin originally shows, and has the improved toughness, the less gas emission and the excellent mold releasability and is thus effectively usable for, for example, electrical and electronic applications, automobile applications, plumbing applications, general goods applications and building components.

DESCRIPTION OF SYMBOLS

G Gate

The invention claimed is:

1. A production method of a polyphenylene sulfide resin composition,
the polyphenylene sulfide resin composition comprising: 1 to 100 parts by weight of an olefin elastomer (B); and 0.01 to 10 parts by weight of a carboxylic acid amide wax mixture (C), relative to 100 parts by weight of a polyphenylene sulfide resin (A), wherein the carboxylic acid amide wax mixture (C) is obtained by adding 0.01 to 5 parts by weight of an antioxidant to 100 parts by weight of a carboxylic acid amide wax produced by reaction of a higher aliphatic monocarboxylic acid, a polybasic acid and a diamine,
the production method comprising:
mixing at least the carboxylic acid amide wax in a molten state or in a state dissolved in a solution with the antioxidant;
subsequently adding the polyphenylene sulfide resin (A) and the olefin elastomer (B) to a mixture of the carboxylic acid amide wax and the antioxidant; and
melt kneading a mixture including the polyphenylene sulfide resin (A), the olefin elastomer (B) and the mixture of the carboxylic acid amide wax and the antioxidant.

2. The production method of the polyphenylene sulfide resin composition according to claim 1,
wherein the antioxidant has an alkyl group of terminal structure, and
a difference between a number of carbon atoms n of at least one of the alkyl group of terminal structure of the antioxidant and a number of carbon atoms m of an alkyl group of the higher aliphatic monocarboxylic acid is not greater than 15.

3. The production method of the polyphenylene sulfide resin composition according to claim 1,
wherein the antioxidant comprises a phosphorus antioxidant and/or a hindered phenol antioxidant.

4. The production method of the polyphenylene sulfide resin composition according to claim 1, further comprising:
1 to 400 parts by weight of an inorganic filler (D), relative to 100 parts by weight of the polyphenylene sulfide resin (A).

* * * * *